United States Patent [19]
Koubek et al.

[11] Patent Number: 5,641,349
[45] Date of Patent: Jun. 24, 1997

[54] WATER-BASED ADHESIVES CONTAINING THERMALLY-INHIBITED STARCHES

[75] Inventors: Timothy C. Koubek, Clinton; Russell J. Nesiewicz, Somerset; Michael T. Philbin, Hopewell; Joseph Wieczorek, Jr., Flemington; Chung-Wai Chiu, Westfield; Eleanor Schiermeyer, Bound Brook, all of N.J.; David J. Thomas, Eagan, Minn.; Manish B. Shah, Franklin Park; Daniel B. Solarek, Belle Mead, both of N.J.

[73] Assignee: National Starch and Chemical Investment Holding Corporation, Wilmington, Del.

[21] Appl. No.: 594,543

[22] Filed: Jan. 31, 1996

Related U.S. Application Data

[63] Continuation-in-part of PCT/US96/00988, Jan. 24, 1996, which is a continuation-in-part of Ser. No. 377,544, Jan. 24, 1995, and Ser. No. 385,259, Feb. 8, 1995, abandoned.

[51] Int. Cl.$^6$ ........................... C09J 103/02
[52] U.S. Cl. ........................... 106/206.1
[58] Field of Search ........................... 106/210, 206.1

[56] References Cited

U.S. PATENT DOCUMENTS

| | | | |
|---|---|---|---|
| 2,274,789 | 3/1942 | Horesi | 127/38 |
| 2,317,752 | 4/1943 | Fuller | 127/33 |
| 2,373,016 | 4/1945 | Daly et al. | 127/70 |
| 2,427,328 | 9/1947 | Schopmeyer et al. | 127/32 |
| 2,590,912 | 4/1952 | Yarber | 127/32 |
| 2,791,512 | 5/1957 | Hatch et al. | 106/208 |
| 2,897,086 | 7/1959 | Sowell et al. | 99/139 |
| 3,155,527 | 11/1964 | Mentzer | 106/210 |
| 3,331,697 | 7/1967 | Salamon | 106/213 |
| 3,399,081 | 8/1968 | Bernetti et al. | 127/71 |
| 3,408,214 | 10/1968 | Mentzer | 106/212 |
| 3,463,668 | 8/1969 | Evans et al | 127/32 |
| 3,477,903 | 11/1969 | Semegran et al. | 161/266 |
| 3,490,917 | 1/1970 | Doe et al. | 99/93 |
| 3,515,591 | 6/1970 | Feldman et al. | 127/32 |
| 3,563,798 | 2/1971 | Germino et al. | 127/32 |
| 3,578,497 | 5/1971 | Hjermstad | 127/32 |
| 3,607,394 | 9/1971 | Germino et al. | 127/32 |
| 3,607,396 | 9/1971 | Germino et al. | 127/71 |
| 3,640,756 | 2/1972 | Beersma et al. | 117/76 |
| 3,690,938 | 9/1972 | Swift | 117/122 |
| 3,725,387 | 4/1973 | McClendon et al. | 260/233.3 |
| 3,810,783 | 5/1974 | Bomball | 117/122 |
| 3,844,807 | 10/1974 | Bramel | 106/213 |
| 3,950,593 | 4/1976 | Bomball | 428/476 |
| 3,967,975 | 7/1976 | Idaszak | 127/23 |
| 3,977,897 | 8/1976 | Wurzburg et al. | 127/71 |
| 4,013,799 | 3/1977 | Smalligan et al. | 426/578 |
| 4,131,574 | 12/1978 | Isherwood et al. | 260/17.3 |
| 4,256,509 | 3/1981 | Tuschhoff et al. | 127/32 |
| 4,266,348 | 5/1981 | Ledding | 34/10 |
| 4,280,851 | 7/1981 | Pitchon et al. | 127/33 |
| 4,303,451 | 12/1981 | Seidel et al. | 127/32 |
| 4,303,452 | 12/1981 | Ohira et al. | 127/32 |
| 4,329,181 | 5/1982 | Chiu et al. | 106/213 |
| 4,366,275 | 12/1982 | Silano et al. | 524/47 |
| 4,391,836 | 7/1983 | Chiu | 426/578 |
| 4,465,702 | 8/1984 | Eastman et al. | 426/578 |

(List continued on next page.)

FOREIGN PATENT DOCUMENTS

| | | |
|---|---|---|
| 1 150 934 | 8/1983 | Canada . |
| 0 129 227 A1 | 12/1984 | European Pat. Off. . |
| 0 257 338 A2 | 3/1988 | European Pat. Off. . |
| 0 321 216 A2 | 6/1989 | European Pat. Off. . |
| 0 415 385 A2 | 3/1991 | European Pat. Off. . |
| 0 490 424 A1 | 6/1992 | European Pat. Off. . |
| 60-97331 | 5/1985 | Japan . |
| 61-254602 | 11/1986 | Japan . |
| 263897 | 12/1926 | United Kingdom . |
| 530226 | 12/1940 | United Kingdom . |
| 595552 | 12/1947 | United Kingdom . |
| 1479515 | 7/1977 | United Kingdom . |
| WO 95/04082 | 2/1995 | WIPO . |

OTHER PUBLICATIONS

Irving Martin, *Journal of Applied Polymer Science*, "Crosslinking of Starch by Alkaline Roasting", vol. 11, No. 5, pp. 1283–1288 (May 1967).

J. W. Donovan et al., *Cereal Chemistry*, "Differential Scannign Calorimetry of Heat–Moisture Treated Wheat and Potato Starches", vol. 60, No. 5, pp. 381–387 (1983) no month avail.

Rolf Stute, *Starch/Stärke*, "Hydrothermal Modification of Starches The Difference Between Annealing and Heat/Moisture Treatment", vol. 44, No. 6, pp. 205–214 (1992) no month avail.

L. Sair et al., *Industrial and Engineering Chemistry*, "Water Sorption by Starches", vol. 36, No. 3, pp. 18–21 no date avail.

Dong–Hyun Lee et al., *Chem. Eng. Technol.*, "Drying Characteristics of Starch in an Inert Medium Fluidized Bed", vol. 16, pp. 263–269 (1993) no month avail.

"The bepex Fluid Bed" (Bulletin) no date avail.

Cristina Ferrero et al., *Journal of Food Processing and Preservation*, "Stability of Frozen Starch Pastes: Effect of Freezing, Storage and Xanthan Gum Addition", vol. 17, pp. 191–211 (1993) no month avail.

Copy of PCT Search Reports for PCT/US95/00682, PCT/US95/00688, PCT/US95/00684, PCT/US94/08559, PCT/US95/09138, and PCT/US96/00999 no date avail.

*Primary Examiner*—David Brunsman
*Attorney, Agent, or Firm*—Margaret B. Kelley

[57] ABSTRACT

Thermally-inhibited starches and flours are used in conventional water-based adhesives such as corrugating, cigarette, remoistenable, kraft adhesives. The starches or flours are thermally-inhibited by dehydrating the starch to anhydrous or substantially anhydrous and then heat-treating the starch or flour for a time and at a temperature sufficient to inhibit the starch and improve its viscosity stability. The starch or flour may be thermally or non-thermally dehydrated (e.g., by alcohol extraction or freeze-drying). Preferably, the pH of the starch is adjusted to at least a neutral pH prior to the dehydration.

23 Claims, No Drawings

U.S. PATENT DOCUMENTS

| | | | |
|---|---|---|---|
| 4,491,483 | 1/1985 | Dudacek et al. | 127/33 |
| 4,575,395 | 3/1986 | Rubin | 127/32 |
| 4,600,472 | 7/1986 | Pitchon et al. | 159/4 B |
| 4,610,760 | 9/1986 | Kirkpatrick et al. | 159/4.01 |
| 4,847,371 | 7/1989 | Schara et al. | 536/111 |
| 5,037,929 | 8/1991 | Rajagopalan et al. | 426/578 |
| 5,085,228 | 2/1992 | Mooney et al. | 131/37 |
| 5,087,649 | 2/1992 | Wegner et al. | 524/30 |
| 5,149,799 | 9/1992 | Rubens | 536/102 |
| 5,155,140 | 10/1992 | Marten et al. | 523/100 |
| 5,181,959 | 1/1993 | Nagai et al. | 106/211 |
| 5,329,004 | 7/1994 | Eden et al. | 536/109 |
| 5,368,690 | 11/1994 | Solarek et al. | 162/175 |

WATER-BASED ADHESIVES CONTAINING THERMALLY-INHIBITED STARCHES

This application is a continuation-in-part of pending PCT application PCT/US96/00988 filed Jan. 24, 1996, which is a continuation-in-part of both U.S. application Ser. No. 08/377,544 filed Jan. 24, 1995 and U.S. application Ser. No. 08/385,259 filed Feb. 8, 1995 now abandoned.

BACKGROUND OF THE INVENTION

This invention relates to water-based adhesives containing starches and flours.

Heat Treatment of Starches and Flours

Heat/moisture treatment and annealing of starches and/or flours are taught in the literature and distinguished by the amount of water present. "Annealing" involves slurrying a granular starch with excess water at temperatures below the starch's or flour's gelatinization temperature. "Heat/moisture-treatment" involves a semi-dry treatment at temperatures below the starch's or flour's gelatinization temperature, with no added moisture and with the only moisture present being that normally present in a starch granule (which is typically 10% or more).

In the following discussion, a history of the various heat/moisture and annealing treatments of starch and/or flour is set out.

GB 263,897 (accepted Dec. 24, 1926) discloses an improvement in the heat treatment process of GB 228,829. The process of the '829 patent involves dry heating flour or wheat to a point at which substantially all of the gluten is rendered non-retainable in a washing test and then blending the treated flour or wheat with untreated flour or wheat to provide a blend having superior strength. The improvement of the '897 patent is continuing the dry heating, without, however, gelatinizing the starch, for a considerable time beyond that necessary to render all of the gluten non-retainable. "Dry-heating" excludes heating in a steam atmosphere or an atmosphere containing considerable quantities of water vapor which would tend to gelatinize the starch. The wheat or flour may contain the usual amount of moisture, preferably not greater than 15%. The heat treatment may exceed 7 hours at 77°–93° C. (170°–200° F.), e.g., 8 to 14 hours at 82° C. (180° F.) or 6 hours at 100° C. (212° F.).

GB 530,226 (accepted Dec. 6, 1940) discloses a method for drying a starch cake containing about 40–50% water with hot air or another gas at 149° C. (300° F.) or above without gelatinizing the starch. The starch cake is disintegrated by milling it to a finely divided state prior to drying.

GB-595,552 (accepted Dec. 9, 1947) discloses treatment of starch, more particularly a corn starch, which involves drying the starch to a relatively low moisture content of 1–2%, not exceeding 3%, and subsequently dry heating the substantially moisture-free starch at 115°–126° C. for 1 to 3 hours. The treatment is intended to render the starch free from thermophilic bacteria. The starch should not be heated longer than necessary to effect the desired sterilization.

U.S. Pat. No. 3,490,917 (issued Jan. 20, 1970 to C. A. F. Doe et al.) discloses a process for preparing a non-chlorinated cake flour suitable for use in cakes and sponges having a high sugar to flour ratio. The starch or a flour in which the gluten is substantially or completely detached from the starch granules is heated to a temperature of from 100°–140° C. and then cooled. The conditions are selected so that dextrinization does not occur, e.g., about 15 minutes at 100°–115° C. and no hold and rapid cooling at the higher temperatures. The heat treatment should be carried out under conditions which allow the water vapor to escape. The reduction in moisture content due to the heat treatment depends upon the temperature employed. At treatment temperatures of 100°–105° C., the moisture content is reduced from 10–12% to 8–9%, by weight, while at medium and high temperatures the moisture content is typically reduced to 7% or less. Preferably, during cooling the moisture is allowed to reach moisture equilibrium with the atmosphere. The gelatinization temperature of the heat treated starch or flour is approximately 0.5°–1° C. higher than that of a comparable chlorinated flour or starch. The heating can be carried out in many ways, including heating in a hot air fluidized bed.

U.S. Pat. No. 3,578,497 (issued May 11, 1971 to E. T. Hjermstad) discloses a process for non-chemically improving the paste and gel properties of potato starch and imparting a swelling temperature as much as 20° to 30° F. higher. A concentrated suspension (20–40% dry solids) at a neutral pH (5.5–8.0, preferably 6–7.5) is heated either for a long time at a relatively low temperature or for a short time at successively higher temperatures. The suspension is first heated at a temperature below the incipient swelling temperature of the particular batch of starch being treated (preferably 49° C.–120° F.). Then the temperature is gradually raised until a temperature well above the original swelling temperature is attained. It is essential that swelling be avoided during the different heating periods so that gelatinization does not occur. After this steeping treatment the starch has a higher degree of granular stability. It resists rapid gelatinization and produces a rising or fairly flat viscosity curve on cooling. The pastes are very short textured, non-gumming, non-slimy, cloudy and non-cohesive. They form firm gels on cooling and aging.

U.S. Pat. No. 3,977,897 (issued Aug. 31, 1976 to Wurzburg et al.) discloses a method for preparing non-chemically inhibited amylose-containing starches. Both cereal and root starches can be inhibited, but the inhibition effects are more observable with root starches. Amylose-free starches, such as waxy corn starch, show no or very slight inhibition. The Brabender viscosity of cooked pastes derived from the treated starch was used to determine the inhibition level. Inhibition was indicated by a delayed peak time in the case of the treated corn starch, by the lack of a peak and a higher final viscosity in the case of the treated achira starch, and by the loss of cohesiveness in the case of the treated tapioca starch. The granular starch is suspended in water in the presence of salts which raise the starch's gelatinization temperature so that the suspension may be heated to high temperatures without causing the starch granules to swell and rupture yielding a gelatinized product. The preferred salts are sodium, ammonium, magnesium or potassium sulfate; sodium, potassium or ammonium chloride; and sodium, potassium or ammonium phosphate. About 10–60 parts of salt are used per 100 parts by weight of starch. Preferably, about 110 to 220 parts of water are used per 100 parts by weight of starch. The suspension is heated at 50°–100° C., preferably 60°–90° C., for about 0.5 to 30 hours. The pH of the suspension is maintained at about 3–9, preferably 4–7. Highly alkaline systems, i.e., pH levels above 9 retard inhibition.

U.S. Pat. No. 4,013,799 (issued Mar. 22, 1977, to Smalligan et al.) discloses heating a tapioca starch above its gelatinization temperature with insufficient moisture (15 to 35% by total weight) to produce gelatinization. The starch is heated to 70°–130° C. for 1 to 72 hours. The starch is used as a thickener in wet, pre-cooked baby foods having a pH below about 4.5.

U.S. Pat. No. 4,303,451 (issued Dec. 1, 1981 to Seidel et al.) discloses a method for preparing a pregelatinized waxy maize starch having improved flavor characteristics reminiscent of a tapioca starch. The starch is heat treated at 120°–200° C. for 15 to 20 minutes. The pregelatinized starch has gel strength and viscosity characteristics suitable for use in pudding mixes.

U.S. Pat. No. 4,303,452 (issued Dec. 1, 1981 to Ohira et al.) discloses smoking a waxy maize starch to improve gel strength and impart a smoky taste. In order to counteract the smoke's acidity and to obtain a final product with a pH of 4–7, the pH of the starch is raised to pH 9–11 before smoking. The preferred water content of the starch during smoking is 10–20%

The article "Differential Scanning Calorimetry of Heat-Moisture Treated Wheat and Potato Starches" by J. W. Donovan et al. in *Cereal Chemistry*, Vol. 60, No. 5, pp. 381–387 (1983) discloses that the gelatinization temperature of the starches increased as a result of the heat/moisture treatment or annealing. See also the article "A DSC Study Of The Effect Annealing On Gelatinization Behavior Of Corn Starch" by B. R. Krueger et al. in Journal of Food Science, Vol. 52, No. 3, pp. 715–718 (1987).

U.S. Pat. No. 4,391,836 (issued Jul. 5, 1983 to C.-W. Chiu) discloses instant gelling tapioca and potato starches which are non-granular and which have a reduced viscosity. Unmodified potato and tapioca starches do not normally gel. The starches of the patent are rendered non-granular and cold-water-dispersible by forming an aqueous slurry of the native starch at a pH of about 5–12 and then drum-drying the slurry. The starches are rendered gelling by heat treating the drum-dried starch for about 1.5 to 24 hours at 125°–180° C. to reduce the viscosity to within defined Brabender viscosity limitations.

U.S. Pat. No. 4,491,483 (issued Jan. 1, 1985 to W. E. Dudacek et al.) discloses subjecting a semi-moist blend of a granular starch with at least 0.25 wt. % of a fatty acid surfactant and sufficient water (about 10–40 wt. %) to a heat-moisture treatment at from about 50°–120° C., followed by drying to about 5–15 wt. %, preferably 10 wt. %, moisture. The heat-moisture treated starch-surfactant product is characterized by a hot water dispersibility of from about 60–100% and a higher pasting temperature than the granular starch from which it is derived. Preferably, the treatment takes place in a closed container so that the moisture can be maintained at a constant level. The preferred conditions are 3 to 16 hours at 60°–90° C. Degradation and dextrinization reactions are undesirable as they destroy the thickening ability of the starch. The use of conditions, such as, e.g., 35% moisture at 90° C. for 16 hours results in reduced paste viscosity. It is believed the presence of the surfactant during the treatment permits formation of a complex within the partially swollen starch matrix with straight chain portions of the starch molecules. The limited moisture environment allows complex formation without gelatinization.

Japanese Patent Publication No. 61-254602, (published Dec. 11, 1987) discloses a wet and dry method for heating waxy corn starch and derivatives thereof to impart emulsification properties. The wet or dry starch is heated at 100°–200° C., preferably 130°–150° C., for 0.5 to 6 hours. In the dry method, the water content is 10%, preferably 5%, or less. In the wet method, the water content is 5 to 50%, preferably 20–30%. The pH is 3.5–8, preferably 4–5.

The article "Hydrothermal Modification of Starches: The Difference between Annealing and Heat/Moisture-Treatment", by Rolf Stute, *Starch/Stärke* Vol. 44, No. 6, pp. 205–214 (1992) reports almost identical modifications in the properties of potato starch with annealing and heat/moisture treatments even through the alteration of the granular structure is different. The Brabender curves of the heat/moisture-treated and annealed potato starches show the same typical changes, including a higher gelatinization temperature and a lower peak viscosity or no peak. The DSC curves also show a shift to higher gelatinization temperatures for both treatments. A combined treatment involving annealing a heat/moisture-treated potato starch leads to a further increase in gelatinization temperature without detectable changes in gelatinization enthalpy and with retention of the viscosity changes caused by the heat treatment. A combined treatment involving annealing a heat/moisture-treat potato starch does not lower the gelatinization temperature, when compared to the base starch, and increases the gelatinization temperature at higher heat/moisture treatment levels.

Chemical Crosslinking of Starches and Flours

Starches and flours are chemically modified with difunctional reagents such as phosphorus oxychloride, sodium trimetaphosphate, mixed adipic/acetic anhydride, and epichlorohydrin to produce chemically crosslinked starches having excellent tolerance to processing variables such as heat, shear, and pH extremes. Such chemically crosslinked starches (also referred to as "inhibited starches") provide a desirable smooth texture and possess viscosity stability throughout processing operations and normal shelf life.

In contrast, when unmodified (i.e., non-crosslinked) starches, particularly waxy-based starches, are gelatinized, they reach a peak viscosity which soon begins to breakdown, lose thickening capacity and textural qualities, and behave unpredictably during storage as a result of the stresses encountered during processing. Heat, shear, and/or an extreme pH, especially an acidic pH, tend to fully disrupt the starch granules and disperse the starch.

ADHESIVES

Starches have long been used as an adhesive material in various applications such as the fabrication of corrugated board, paper bags, paper boxes, laminated paperboard, spiral-wound tubes, gummed labels, gummed tapes and other gumming applications. See the discussion in Starch Chemistry and Technology, 2nd Edition, by R. Whistler et al., 1984, pp. 593–610 and Chapter 22 "Starch and Its Modifications" by M. W. Rutenberg, pp. 22–63 and 22–64 in "Handbook of Water-Soluble Gums and Resins" edited by Robert L. Davidson and published by McGraw-Hill Book Co. (1980).

U.S. Pat. No. 2,791,512 (issued May 7, 1957 to Hutch et al.) discloses remoistening adhesive compositions which are an intimate mixture of water and dextrinized amylopectin which is substantially free of amylose (e.g., waxy maize). At about 40–60% solids, the viscosity is 2,000–20,000 cps at about 52°–54° C. (125°–130° F.). Up to 30% of ordinary converted corn starch or corn dextrine can be included in the adhesive composition.

U.S. Pat. No. 3,155,527 (issued Nov. 3, 1964 to Mentzer) discloses a water-resistant adhesive suitable for paper board production contains about 1 part of gelatinized starch, about 3–6 parts of ungelatinized starch, about 0.5–2 parts of urea, about 0.25–1 part of formaldehyde, about 15–25 parts of water, and an alkaline material present in an amount sufficient to give a pH of about 10–12.5. The carrier portion is formed by gelatinizing starch in an alkaline medium, cooling the resulting paste, and mixing with a slurry of ungelatinized starch, water, urea, and formaldehyde. Suitable starches include those normally present in water-resistant adhesives, e.g., corn, potato, waxy maize, sorghum, and/or tapioca.

U.S. Pat. No. 3,331,697 (issued Jul. 18, 1967 to Salamon) discloses an adhesive adapted for bonding gypsum and other cellulosic materials which is an aqueous paste containing about 3–15 wt. % of an alkylene oxide-modified starch (e.g., potato starch reacted with 1–7% ethylene oxide), about 2–20 wt. % of a fibrous reinforcing filler (e.g., asbestos), about 30–65 wt. % of a particulate filler (e.g., finely divided limestone, and water in an amount sufficient to give a solid content of 45–75 wt. %.

U.S. Pat. No. 3,408,214 (issued Oct. 29, 1968 to Mentzer) discloses a remoistening adhesive which has improved open time and bond time. The adhesive mixture contains an ungelatinized chemically modified starch substantially free of set back propylene or polyethylene glycol (200–7,000 mol. wt.), water, and optionally a plasticizer. The components are mixed in sufficient water to give a slurry of 30–70% solids, preferably the pH is adjusted to 8–12, and the mixture is heated to gelatinize the starch.

U.S. Pat. No. 3,477,903 (issued Nov. 11, 1969 to T. S. Semegran et al.) discloses water resistant adhesive compositions which comprise a mixture, in an aqueous medium, of amylose product containing at least 55 wt. % amylose and a peptizing agent selected from the group consisting of alkali metal hydroxides, alkali or alkaline earth metal salts, salts of transition metals, sodium salicylate, and formaldehyde. The amylose product may be an isolated amylose as the whole starch. The amylose may be heat and/or acid treated or oxidized to give thin boiling starches. The amylose may also be chemically derivatized.

U.S. Pat. No. 3,640,756 (issued Feb. 8, 1972 to Beersma et al.) discloses a remoistenable pregummed paper such as wall paper which are coated with a layer of a high molecular weight polymeric binding agent on which is absorbed a cold-water-swelling, chemically crosslinked granular starch ether or ester containing hydrophilic substituents (e.g., a crosslinked granular starch phosphate prepared by reaction with a phosphorus-containing acid and urea or a crosslinked granular carboxymethyl starch crosslinked with epichlorohydrin. The degree of crosslinking should be 1–50 crosslinks per anhydroglucose unit. All starch bases are suitable.

U.S. Pat. No. 3,690,938 (issued Sep. 12, 1972 to T. G. Swift) discloses a remoistenable adhesive composition with excellent "slip" properties for preparted wall coverings. The adhesive is a blend of 30–40 wt. % of an acid-hydrolyzed waxy starch (at least 80% amylopectin), 15–25 wt. % of a slip agent such as methyl, hydroxyethyl, and carboxymethyl cellulose, and 35–55 wt. % (dry solids) of a plasticizer such as sodium or potassium methacrylate.

U.S. Pat. No. 3,810,783 (issued May 14, 1974 to W. A. Bomball) discloses a starch-based remoistenable prepasted wallcovering adhesive which comprises an oxidized yellow dent corn starch, methyl ether of cellulose, predispersed coating clay, hydrolyzed polyvinyl alcohol, monobasic sodium phosphate, paraffin wax, a sodium salt of sulfonated paraffin wax, a crosslinking agent such as glyoxal, small amounts of a suitable fungicide, and optionally polyvinyl acetate. The oxidation is controlled to give a starch with a Brookfield viscosity of 1,200–2,000 cps (30% solids, 155° F., 20 rpm, No. 3 spindle).

U.S. Pat. No. 3,844,807 (issued Oct. 29, 1974 to G. F. Bramel) discloses water resistant, short tack adhesive paste for bonding paper products such as multi-wall envelope bags. The dry pre-blend comprises two premix blends of acid hydrolyzed starch, hydroxyethylated starch, buffering salts and a specific type of starch modifier (e.g., polyoxyethylene laurate). The preblends and mixture thereof are slurried with water and a urea-formaldehyde resin (added for water resistance prior to use. The mixture is then cooked.

U.S. Pat. No. 3,950,593 (issued Apr. 13, 1976 to W. A. Bomball et al.) discloses adhesive formulations for pregummed remoistenable tape having a long open time and short tack time. An acid hydrolyzed derivatized waxy maize starch is used as a replacement for animal glue. In one embodiment, the major ingredient is a waxy maize starch which is first acid hydrolyzed and then copolymerized with an acrylamide monomer. In a second embodiment, an acid-hydrolyzed, cyanoethylated waxy maize starch provides the major adhesive ingredient.

U.S. Pat. No. 4,329,181 (issued May 11, 1982 to Chiu et al.) discloses a corrugating adhesive having improved tack where the gelatinized carrier starch is an amylose starch containing at least 40% amylose and an alkalilabile stabilizing groups (e.g., acetyl) which are removed when the carrier starch is incorporated into an alkaline corrugating adhesive.

U.S. Pat. No. 4,366,275 (issued Dec. 28, 1982 to M. A. Silano et al.) discloses a water-resistant starch-based alkaline corrugating adhesive composition which contains a crosslinking additive which is low in free formaldehyde.

U.S. Pat. No. 5,085,228 (issued Feb. 4, 1992 to N. T. Mooney et al.) discloses a starch-based adhesive for cigarette manufacturing which comprises a mixture of a chemically crosslinked starch, a fluidity or converted starch. The starches have an amylopectin content of at least 70 wt. % and are prepared by cooking at high temperature and pressure. Suitable starches include waxy maize, waxy rice, tapioca, potato, maize (corn), wheat, arrowroot and sago.

U.S. Pat. No. 5,087,649 (issued Feb. 11, 1992 to J. Wegner et al.) discloses a dry paste, such as a wallpaper paste, which is prepared from a mixture containing carboxymethylated and/or alkoxylated starch, a cellulose ether, a water dispersible or water soluble polymer, other conventional additives (preservatives, wetting agents, and fillers), and water. The adhesive is dried in a thin layer on surface by heating to 80°–200° C. The starch can be optionally treated with a chemical crosslinking agent.

U.S. Pat. No. 5,155,140 (issued Oct. 13, 1992 to K. Marten et al.) discloses a cigarette gluing adhesive which is an aqueous mixture containing gum arabic, a water soluble starch degradation product (oxidatively or hydrolytically degraded starches and dextrins) and/or carboxymethyl starch and/or gelatinized starch an optionally typical preservatives.

U.S. Pat. No. 5,329,004 (issued Jul. 12, 1994 to J. L. Eden et al.) discloses a cigarette manufacturing adhesive which is a natural based liquid starch phosphate. The starch phosphate is made from a fluidity or converted starch having a high amylopectin content. The final starch phosphate composition is steam injection cooked at high temperature and pressure.

There is a need in the adhesives industry for non-chemically-crosslinked starches which have the same functional properties as chemically-crosslinked starches.

SUMMARY OF INVENTION

The present invention provides aqueous-based adhesives which comprise an aqueous-based carrier and a cooked or precooked (i.e., pregelatinized) thermally-inhibited starch or flour. The thermally-inhibited starch or flour may be a granular starch or a pregelatinized granular or non-granular starch. The pregelatinization may be carried out prior to or after the thermal inhibition. For some uses modified thermally-inhibited starches or flours may be useful.

The starches and flours are thermally inhibited, without the addition of chemical reagents, in a heat treatment process that results in the starch or flour becoming and remaining inhibited. The starches and flours are referred to as "inhibited" or "thermally-inhibited (abbreviated "T-I"). When these thermally-inhibited starches and flours are dispersed and/or cooked in water, they exhibit the textural and viscosity properties characteristic of a chemically-crosslinked starch. The starch granules are more resistant to viscosity breakdown. This resistance to breakdown results in what is subjectively considered a non-cohesive or "short" textured paste, meaning that the gelatinized starch or flour tends to be salve-like and heavy in viscosity rather than runny or gummy.

When the thermally-inhibited starches and flours are non-pregelatinized granular starches or flours, the starches or flours exhibit an unchanged or reduced gelatinization temperature. In contrast, most annealed and heat/moisture treated starches show an increased gelatinization temperature. Chemically-crosslinked starches show an unchanged gelatinization temperature. It is believed the overall granular structure of the thermally-inhibited starches and flours has been altered.

The starches and flours that are substantially completely inhibited will resist gelatinization. The starches and flours that are highly inhibited will gelatinize to a limited extent and show a continuing rise in viscosity but will not attain a peak viscosity. The starches and flours that are moderately inhibited will exhibit a lower peak viscosity and a lower percentage breakdown in viscosity compared to the same starch that is not inhibited. The starches and flours that are lightly inhibited will show a slight increase in peak viscosity and a lower percentage breakdown in viscosity compared to the same starch that is not inhibited.

The starches and flours are inhibited by a process which comprises the steps of dehydrating the starch or flour until it is anhydrous or substantially anhydrous and then heat treating the anhydrous or substantially anhydrous starch or flour at a temperature and for a period of time sufficient to inhibit the starch or flour. As used herein, "substantially anhydrous" means containing less than 1% moisture by weight. The dehydration may be a thermal dehydration or a non-thermal dehydration such alcohol extraction or freeze drying. An optional, but preferred, step is adjusting the pH of the starch or flour to neutral or greater prior to the dehydration step.

The amount of thermal inhibition required will depend on the reason the starch or flour is included in the adhesive, as well as the particular processing conditions used to prepare the adhesive. Adhesives prepared with the thermally-inhibited starches and flours will possess viscosity stability, process tolerance such as resistance to heat, acid, and shear, and improved texture. Aqueous dispersions or cooks of the thermally-inhibited starches exhibit enhanced viscosity stability and, in some cases, increased adhesion which makes them particularly useful in adhesives.

Depending on the extent of the heat treatment, various levels of inhibition can be achieved. For example, lightly inhibited, higher viscosity products with little breakdown, as well as highly inhibited, low viscosity products with no breakdown, can be prepared by the thermal inhibition process described herein.

Typically, if a highly inhibited starch or flour is used, the amount of the starch or flour is about 1–20%, preferably 2–5%, by weight based on the weight of the adhesive composition. Typically, if a lightly inhibited starch or flour is used, the amount of the starch or flour is about 1–40%, preferably 10–20%, by weight based on the weight of the adhesive composition.

The adhesives can be a liquid adhesive or a paste prepared by cooking the starch or flour in an aqueous medium or a dried film of a remoistenable adhesive. Adhesives containing the thermally-inhibited starches or flours are especially useful for kraft adhesives, cigarette-making adhesives, envelope adhesives, corrugating adhesives, lay-flat laminating adhesives, tube-winding adhesives, bottle labeling adhesives, other packaging and converting adhesives, and in the preparation of ceramic tile cement.

DESCRIPTION OF THE PREFERRED EMBODIMENTS

All starches and flours are suitable for use herein. The thermally-inhibited starches and flours can be derived from any native source. A native starch or flour is one as it is found in nature in unmodified form. Typical sources for the starches and flours are cereals, tubers, roots, legumes and fruits. The native source can be corn, pea, potato, sweet potato, banana, barley, wheat, rice, sago, amaranth, tapioca, sorghum, waxy maize, waxy tapioca, waxy pea, waxy wheat, waxy rice, waxy barley, waxy potato, waxy sorghum, starches containing greater than 40% amylose, and the like.

The thermal inhibition process may be carried out prior to or after other starch or flour reactions used to modify starch or flour. The starches may be modified by conversion (i.e., acid-, enzyme-, and/or heat-conversion), oxidation, phosphorylation, etherification (e.g., by reaction with propylene oxide), esterification (e.g., by reaction with acetic anhydride or octenylsuccinic anhydride), and/or chemical crosslinking (e.g., by reaction with phosphorus oxychloride or sodium trimetaphosphate). The flours may be modified by bleaching or enzyme conversion. Procedures for modifying starches are described in the Chapter "Starch and Its Modification" by M. W. Rutenberg, pages 22–26 to 22–47, Handbook of Water Soluble Gums and Resins, R. L. Davidson, Editor (McGraw-Hill, Inc., New York, N.Y. 1980).

Native granular starches have a natural pH of about 5.0 to 6.5. When such starches are heated to temperatures above about 125° C. in the presence of water acid hydrolysis (i.e., degradation) of the starch occurs. This degradation impedes or prevents inhibition. Therefore, the dehydration conditions need to be chosen so that degradation is avoided. Suitable conditions are thermally dehydrating at low temperatures and the starch's natural pH or thermally dehydrating at higher temperatures after increasing the pH of the starch to neutral or above. As used herein, "neutral" covers the range of pH values around pH 7 and is meant to include from about pH 6.5–7.5. A pH of at least 7 is preferred. More preferably, the pH is 7.5–10.5. The most preferred pH range is above 8 to below 10. At a pH above 12, gelatinization more easily occurs. Therefore, pH adjustments below 12 are more effective. It should be noted that the textural and viscosity benefits of the thermal inhibition process tend to be enhanced as the pH is increased, although higher pHs tend to increase browning of the starch or flour during the heat treating step.

To adjust the pH, the non-pregelatinized granular starch or flour is typically slurried in water or another aqueous medium, in a ratio of 1.5 to 2.0 parts of water to 1.0 part of starch or flour, and the pH is raised by the addition of any suitable base. Buffers, such as sodium phosphate, may be used to maintain the pH if needed. Alternatively, a solution of a base may be sprayed onto the powdered starch or flour until the starch or flour attains the desired pH, or an alkaline gas such as ammonia can be infused into the starch or flour. After the pH adjustment, the slurry is then either dewatered and dried, or dried directly, typically to a 2–15% moisture content. These drying procedures are to be distinguished from the thermal inhibition process steps in which the starch or flour is dehydrated to anhydrous or substantially anhydrous and then heat treated.

The starches or flours can be pregelatinized prior to or after the thermal inhibition process using methods known in the art. The amount of pregelatinization, and consequently, whether the starch will display a high or a low initial viscosity when dispersed in water, can be regulated by the pregelatinization procedure used, as is known in the art. The resulting pregelatinized starches are useful in applications where cold-water-soluble or cold-water-dispersible starches are used.

Pregelatinized granular starches and flours have retained their granular structure but lost their polarization crosses. They are pregelatinized in such a way that a majority of the starch granules are swollen, but remain intact. Exemplary processes for preparing pregelatinized granular starches are disclosed in U.S. Pat. No. 4,280,851 (issued Jul. 28, 1981 to E. Pitchon et al.), U.S. Pat. No. 4,465,702 (issued Aug. 14, 1984 to J. E. Eastman et al.), U.S. Pat. No. 5,037,929 (issued Aug. 6, 1991 to S. Rajagopalan), and U.S. Pat. No. 5,149,799 (issued Sep. 22, 1992 to Roger W. Rubens), the disclosures of which are incorporated by reference.

Pregelatinized non-granular starches and flours have also lost their polarization crossese and have become so swollen that the starches have lost their granular structure and broken into fragments. They can be prepared according to any of the known physical, chemical or thermal pregelatinization processes that destroy the granule such as drum drying, extrusion, or jet-cooking. See U.S. Pat. No. 1,516,512 (issued Nov. 25, 1924 to R. W. G. Stutzke); U.S. Pat. No. 1,901,109, (issued Mar. 14, 1933 to W. Maier); U.S. Pat. No. 2,314,459 (issued Mar. 23, 1943 to A. A. Salzburg; U.S. Pat. No. 2,582,198 (issued Jan. 8, 1957 to O. R. Ethridge); U.S. Pat. No. 2,805,966 (issued Sep. 10, 1957 to O. R. Ethridge); U.S. Pat. No. 2,919,214 (issued Dec. 29, 1959 to O. R. Ethridge); U.S. Pat. No. 2,940,876 (issued Jun. 14, 1960 to N. E. Elsas); U.S. Pat. No. 3,086,890 (issued Apr. 23, 1963 to A. Sarko et al.); U.S. Pat. No. 3,133,836 (issued May 19, 1964 to U. L. Winfrey); U.S. Pat. No. 3,137,592 (issued Jun. 16, 1964 to T. F. Pratzman et al.); U.S. Pat. No. 3,234,046 (issued Feb. 8, 1966 to G. R. Etchison); U.S. Pat. No. 3,607,394 (issued Sep. 21, 1971 to F. J. Germino); U.S. Pat. No. 3,630,775 (issued Dec. 18, 1971 to A. A. Winkler); and U.S. Pat. No. 5,131,953 (issued Jul. 21, 1992 to J. J. Kasica et al.); the disclosures of which are incorporated by reference.

If the pregelatinization process is performed first and the pregelatinized starch or flour is granular, the pH is adjusted by slurrying the pregelatinized granular starch or flour in water in a ratio of 1.5–2.0 parts to 1.0 part starch, and optionally, the pH is adjusted to neutral or greater. In another embodiment, the slurry is simultaneously pregelatinized and dried and the dried, starch or flour is thermally inhibited. If the thermal inhibition process is performed first, the starch or flour is slurried in water, the pH of the starch or flour is adjusted to neutral or greater, and the starch or flour is dried to about 2–15% moisture. The dried starch or flour is then dehydrated and heat treated. The inhibited starch or flour is reslurried in water, optionally pH adjusted, and simultaneously pregelatinized and dried.

For non-granular pregelatinized starches or flours prepared by drum drying, the pH is raised by slurrying the starch or flour in water at 30–40% solids and adding a sufficient amount of a solution of a base until the desired pH is reached.

For non-granular pregelatinized starches or flours prepared by the continuous coupled jet-cooking/spray-drying process of U.S. Pat. No. 5,131,953 or the dual atomization/spray-drying process of U.S. Pat. No. 4,280,851, the starch or flour is slurred at 6–10% solids in water and the pH is adjusted to the desired pH by adding a sufficient amount of a solution of a base until the desired pH is reached.

Suitable bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, and any other bases approved for use under applicable regulatory laws. The preferred base is sodium carbonate. It may be possible to use bases not approved under the above regulations provided they can be washed from the starch so that the final product conforms to good manufacturing practices for the desired end use.

A thermal dehydration is carried out by heating the starch or flour heating device for a time and at a temperature sufficient to reduce the moisture content to less than 1%, preferably 0%. Preferably, the temperatures used are 125° C. or less, more preferably 100° to 120° C. The dehydrating temperature can be lower than 100° C., but a temperature of at least 100° C. will be more efficient for removing moisture.

Representative processes for carrying out the non-thermal dehydration include freeze drying or extracting the water from the starch or flour using a solvent, preferably a hydrophilic solvent, more preferably a hydrophilic solvent which forms an azeotropic mixture with water (e.g., ethanol).

For a laboratory scale dehydration with a solvent, the starch or flour (about 4–5% moisture) is placed in a Soxhlet thimble which is then placed in the Soxhlet apparatus. A suitable solvent is placed in the apparatus, heated to the reflux temperature, and refluxed for a time sufficient to dehydrate the starch or flour. Since during the refluxing the solvent is condensed onto the starch or flour, the starch or flour is exposed to a lower temperature than the solvent's boiling point. For example, during ethanol extraction the temperature of the starch is only about 40°–50° C. even though ethanol's boiling point is above 78° C. When ethanol is used as the solvent, the refluxing is continued for about 17 hours. The extracted starch or flour is removed from the thimble, spread out on a tray, and the excess solvent is allowed to flash off. The time required for ethanol to flash off is about 20–30 minutes. The dehydrated starch or flour is immediately placed in a suitable heating apparatus for the heat treatment. For a commercial scale dehydration any continuous extraction apparatus is suitable.

For dehydration by freeze drying, the starch or flour (4–5% moisture) is placed on a tray and put into a freeze dryer. A suitable bulk tray freeze dryer is available from FTS Systems of Stone Ridge, N.Y. under the trademark Dura-Tap. The freeze dryer is run through a programmed cycle to remove the moisture. The temperature is held constant at about 20° C. and a vacuum is drawn to about 50 milliTorr (mT). The starch or flour is removed from the freeze dryer and immediately placed into a suitable heating apparatus for the heat treatment.

After it is dehydrated, the starch or flour is heat treated for a time and at a temperature sufficient to inhibit the starch or flour. The preferred heating temperatures are greater than about 100° C. For practical purposes, the upper limit of the heat treating temperature is about 200° C. Typical temperatures are 120°–180° C., preferably 140°–160° C., most preferably 160° C. The temperature selected will depend upon the amount of inhibition desired and the rate at which it is to be achieved.

The time at the final heating temperature will depend upon the level of inhibition desired. When a conventional oven is used, the time ranges from 1 to 20 hours, typically 2–5 hours, usually 3.5–4.5 hours. When a fluidized bed is used, the times range from 0 minutes to 20 hours, typically 0.5–3.0 hours. Longer times are required at lower temperatures to obtain more inhibited starches. Different levels of inhibition may be required depending on the adhesive end use application, e.g., to adjust the final viscosity/solids ratio and/or to achieve specific rheological properties.

For most applications, the thermal dehydrating and heat treating steps will be continuous and accomplished by the application of heat to the starch or flour beginning from ambient temperature. The moisture will be driven off during the heating and the starch or flour will become anhydrous or substantially anhydrous. Usually, at the initial levels of inhibition, the peak viscosities are higher than the peak viscosities of starches or flours heated for longer times, although there will be greater breakdown in viscosity from the peak viscosity. With continued heat treating, the peak viscosities are lower, but the viscosity breakdowns are less.

The process may be carried out as part of a continuous process involving the extraction of the starch from a plant material.

As will be seen in the following examples, the source of the starch or flour, initial pH, dehydrating conditions, heating time and temperature, and equipment used are all interrelated variables that affect the amount of inhibition.

The heating steps may be performed at normal pressures, under vacuum or under pressure, and may be accomplished by conventional means known in the art. The preferred method is by the application of dry heat in dry air or in an inert gaseous environment.

The heat treating step can be carried out in the same apparatus in which the thermal dehydration occurs. Most conveniently, the process is continuous with the thermal dehydration and heat treating occurring in the same apparatus, as when a fluidized bed reactor is used.

The dehydrating and heat treating apparatus can be any industrial ovens, conventional ovens, microwave ovens, dextrinizers, dryers, mixers and blenders equipped with heating devices and other types of heaters, provided that the apparatus is fitted with a vent to the atmosphere so that moisture does not accumulate and precipitate onto the starch or flour. The preferred apparatus is a fluidized bed. Preferably, the apparatus is equipped with a means for removing water vapor, such as, a vacuum or a blower to sweep air or the fluidizing gas from the head-space of the fluidized bed. Suitable fluidizing gases are air and nitrogen. Dry air is preferred. For safety reasons, it is preferable to use a gas containing less than 12% oxygen.

Superior inhibited starches and flours having high viscosities with low percentage breakdown in viscosity are obtained in shorter times in the fluidized bed reactor than can be achieved using other conventional heating ovens or dryers.

The starches may be inhibited individually or more than one may be inhibited at the same time. The starches may be inhibited in the presence of other materials or ingredients that would not interfere with the thermal inhibition process or alter the properties of the starch product.

Optional steps can be carried out to improve the color and/or flavor. They include washing the starch or flour with water and/or removing protein and/or lipid from the starch or flour prior to the dehydrating step and/or after the heat treating step. A bleaching agent (e.g., sodium chlorite) or an alkali can be used for the protein and/or lipid removal.

Following the thermal inhibition step, the resulting starches may be screened to the desired particle size. If the starch is a non-pregelatinized granular starch, the starch can be slurried in water, washed, filtered, dried, and bleached. If the starch is a granular pregelatinized starch, the starch can be washed by any known methods that will maintain granular integrity.

If desired, the pH may be adjusted.

The thermally-inhibited starches and flours can be used wherever starches and flours are conventionally used in adhesives. Typical adhesive categories include liquid adhesives, pastes, cold-water-soluble adhesives, water-resistant adhesives, and numerous other applications. In most applications, the starch is cooked and solubilized and used as either the only component in addition to water in the adhesive or as an added component in more complex formulations to provide the required tack, overall adhesion, solution viscosity, stability, and/or desired rheological characteristics.

Adhesives for specific applications include corrugating adhesives, multiwall bag adhesives, laminating adhesives, tube-winding adhesives, labelling adhesives, side bag seam adhesives, tissue and towel adhesives, cigarette adhesives, wallpaper adhesives, adhesives for disposables, remoistenable adhesives, bookbinding adhesives, cup and plate adhesives, case and carton seal adhesives, carton forming adhesives, glued lap adhesives, and the like.

Most cigarette-making adhesives are based on synthetic polymer systems. There is, however, a growing trend to the use of natural products in this area. Modified starches, such as chemically modified starches and dextrins, are being used for such constructions. Adhesives containing these starches and dextrins have a Brookfield viscosity of approximately 500–5000 cps., and they are used in all applications including side seams and tipping. A side seam is the bond produced to facilitate the formation of the tobacco filled cigarette rod. Tipping is the process by which the separate filter section is combined with the tobacco filled section by means of an overlapping bond.

Conventional remoistenable envelope adhesives are prepared by the addition of dextrin, plasticizer and other additives to dextrin-emulsified vinyl acetate homopolymers. These adhesives are characterized by superior drying speeds and high gloss, properties particularly desirable for such applications.

Corrugating adhesives are prepared using starch, water, alkali, and other optional ingredients, e.g., a waterproofing agent. Starches used as the carrier portion may contain portions or mixtures of high amylose starch.

Adhesives are also used for bottle labelling, tubewinding, lay flat laminating, and tissue/towel and disposable articles.

Envelope Adhesives

The dextrins utilized in the envelope adhesives may be derived from any available starch base including, but not limited to, waxy maize, waxy sorghum, sago, tapioca, potato, corn, sorghum, rice and wheat as well as the derivatives thereof. In all instances the starch base should be in ungelatinized form and should remain in that form throughout the subsequent dextrinization process.

In converting these starch bases into dextrins, one may employ any of the usual dextrinization procedures well known to those skilled in the art, including treatment of starch with either heat or acid. It should be noted that when reference is made to "dextrins," it includes the degraded starch products prepared either by means of a process wherein the applicable starches are converted with acids and/or oxidizing agents, in the presence of water, at superatmospheric pressures and temperatures (in excess of about 212° F.) or by means of enzyme conversion procedures utilizing an enzyme such as alpha-amylase. Additional information relating to the dextrinization of starches may be found Chapters XII–XIII of "Chemistry and Industry of Starch" edited by R. W. Kerr, published in 1950 by the Academic Press of New York, N.Y.

The adhesive polymer base is prepared by conventional ethylene vinyl acetate polymerization procedures with the one difference being the use of an aqueous solution of dextrin as the emulsifier or protective colloid. The polymerization is then carried out in an aqueous medium under pressures less than about 130 atmospheres in the presence of a catalyst. If necessary, the system is maintained at a pH of 2 to 6 by using a suitable buffering agent. The polymerization is performed at conventional temperatures from about 70° to 225° C., preferably from 120° to 175° F., for sufficient time to achieve a low monomer content, e.g., from about 1 to 8 hours, preferably from 3 to 7 hours, and produces a latex having less than 1.5%, preferably less than 0.5% by weight of the free monomer. Conventional batch, semi-continuous or continuous polymerization procedures may be employed. See, for example, U.S. Pat. No. 3,708,388 (issued Jan. 2, 1973 to Iacoviello et al.) and U.S. Pat. No. 4,164,488 (issued Aug. 14, 1979 to Gregorovich et al.).

In addition to the required dextrin solution used as a protective colloid, other emulsifiers, generally of a non-ionic or anionic oil-in-water variety may also be used in the polymerization reaction. When used, the emulsifiers are generally present in amounts of 0.1 to 1% of the monomers used in the polymerization and is added either entirely to the initial charge or added continuously or intermittently during polymerization or as a post-reaction stabilizer.

The preferred polymerization procedure is a modified batch processing wherein the major amounts of some or all the comonomers and emulsifier are charged to the reaction vessel after polymerization has been initiated. It is preferred to add the vinyl ester intermittently or continuously over the polymerization period of about 0.5–10 hours, preferably 2–6 hours.

The lattices are produced and used at relatively high solids contents, e.g., between 35 and 75%, although they may be diluted with water if desired. The preferred total solids are about 40–70%, most preferably about 50–68%, by weight. When used herein the term "solids" refers to the combined amounts of ethylene vinyl acetate resin, dextrin and other non-volatiles present in the latex.

The particle size of the latex can be regulated by the quantity and type of the emulsifying agent or agents employed. To obtain smaller particles sizes, greater amounts of emulsifying agents are used. As a general rule, the greater the amount of the emulsifying agent employed, the smaller the average particle size.

The humectant used herein may be any of those conventionally used in formulating remoistenable "front seal" adhesives, typically sugars, sorbitol, glycerine, propylene glycol, and glycol ethers. These humectants are used in the adhesive formulations at levels of about 0.5–5% by weight of the total adhesive formulation.

In preparing the adhesive composition, an aqueous solution of the dextrin is prepared and added to the ethylene vinyl acetate latex or the dry dextrin is added directly to the latex. The adhesive composition is then heated and maintained at a temperature of about 160°–180° F. with agitation for a period sufficient to ensure complete dissolution. Any other additives which are to be employed are added at this point. The resulting mixture is then diluted with additional water, if necessary, to the desired viscosity, generally in the range of about 2,000 to 11,000 cps, preferably about 6,000 cps. In the embodiment wherein dextrin is not post-added, it may be necessary to add a thickener (e.g., polyacrylamide, carboxymethyl cellulose, or hydroxyethyl cellulose) in order to obtain a viscosity within these limits.

When used in the final adhesive composition, the dextrin will be present in an amount up to about 40%, typically about 8–25%, preferably 15–20%, by weight of the formulation, with the humectant and dextrin-emulsified ethylene vinyl acetate resin comprising the remainder of the composition. Various optional additives, such as plasticizers, preservatives, thickeners, bleaching agents, and the like may also be present in the adhesive compositions in order to modify certain characteristics thereof.

Although the humectant component and the optional additional dextrin have been referred to as being "post-added," it should be recognized that the post-addition is merely the most convenient and generally accepted method of formulating "front" seal adhesives and that it is possible to add the humectant and the additional dextrin directly to the monomer charge prior to the actual polymerization.

Corrugating Adhesives

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as facing, is thereafter applied to these tips. By applying heat and pressure to the two paperboard strips thus brought together, an adhesive bond is formed. The above-described procedure produces what is known as a single-faced board in that the facing is applied to only one surface. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. A typical corrugating process and the use and operation of corrugators are described in U.S. Pat. Nos. 2,102,937 and 2,051,025 (to Bauer).

The particular adhesive employed in the corrugating process is selected on the basis of several factors, including the type of bond required in the final application of the finished corrugated product. Starch-based adhesives are most commonly used due to their desirable adhesive properties, low cost and ease of preparation.

The most fundamental of starch corrugating adhesives is an alkaline adhesive which is comprised of ungelatinized starch suspended in an aqueous dispersion of cooked starch. The adhesive is produced by gelatinizing starch in water with sodium hydroxide (caustic soda) to yield a primary mix of gelatinized or cooked carrier starch. The cooked carrier starch is then slowly added to a secondary mix of ungelatinized starch, borax and water to produce the full-formulation adhesive. In the corrugating process, the adhesive is applied (usually at between 25° and 55° C.) to the tips of the fluted paper medium or single-faced board. Upon the application of heat the ungelatinized starch gelatinizes, resulting in an instantaneous increase in viscosity and the formation of the adhesive bond.

The starch component, which may be an ungelatinized starch and/or a gelatinized carrier starch may be selected from any of the several starches, native or converted, heretofore employed in starch corrugating adhesive compositions. The ungelatinized starch is usually corn starch. Other suitable starches include, for example, those starches derived from corn, potato, waxy maize, sorghum, wheat, as well as high-amylose starches, i.e., starches which contain 40% or more by weight of amylose, and the various derivatives of these starches. Suitable starches include various starch derivatives such as ethers, esters, thin-boiling starches prepared by known processes such as mild acid treatments or oxidation, high amylose starch derivatives. Preferred starches are those typically employed in alkaline corrugating adhesives.

The starch content of the adhesive can vary considerably depending on several factors such as the intended end-use and the type of starch used. The total amount of starch employed, including the gelatinized and ungelatinized portions of starch, ordinarily will be in the range of about 10–40% by total weight of the adhesive.

The remainder of the adhesive composition is composed of about 0.3–5% of an alkali such as sodium hydroxide, based on total weight of starch, about 0.3–10% on dry basis of an optional crosslinking additive (based on total weight of starch), and about 54–89% of water based on total weight of the adhesive. The preferred amounts of all ingredients are 10–35% starch, 1–4% alkali, 60–81% water and, if used, 1–5% of the crosslinking additive. A suitable crosslinking additive is described in U.S. Pat. No. 4,366,275 (issued Dec. 28, 1982 to M. A. Sitano et al.).

The alkali employed herein is preferably sodium hydroxide; however, other bases may be employed as partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

Sample Preparation

Unless indicated otherwise, all the starches and flours used were provided by National Starch and Chemical Company of Bridgewater, N.J.

The controls for the test samples were from the same native source as the test samples, were unmodified or modified in the same manner as the test samples, and were at the same pH unless otherwise indicated.

All starches and flours, both test and control samples, were prepared and tested individually.

The pH of the samples was raised by slurrying the starch or flour in water at 30–40% solids and adding a sufficient amount of a 5% sodium carbonate solution until the desired pH was reached.

Measurements of pH, either on samples before or after the thermal inhibition steps, were made on samples consisting of one part starch or flour to four parts water.

After the pH adjustments, if any, all non-gelatinized granular samples were spray dried or flash dried as conventional in the art (without gelatinization) to about 2–15% moisture.

After the pH adjustment, if any, slurries of the starches to be pregelatinized to granular pregelatinized starches were introduced into a pilot spray dryer, Type 1-KA#4F, from APV Crepaco, Inc., Dryer Division, Attleboro Falls, Mass., using a spray nozzle, Type 1/2J, from Spraying Systems Company of Wheaton, Ill. The spray nozzle had the following configurations: fluid cap 251376, air cap 4691312. The low initial cold viscosity samples were sprayed at a steam:starch ratio of 3.5–4.5:1, and the high initial cold viscosity samples were sprayed at a steam:starch ratio of 5.5–6.5:1. Moisture content of all pregelatinized samples after spray drying and before the dehydration step in the thermal inhibition process was 4–10%.

For the samples pregelatinized by drum drying the pH was raised by slurrying the starch or flour in water at 30–40% solids and adding a sufficient amount of a 5% sodium carbonate solution until the desired pH was reached. A single steam-heated steel drum at about 142°–145° C. was used for the drum drying.

For the samples pregelatinized by the continuous coupled jet-cooking/spray-drying process of U.S. Pat. No. 5,131,953 or the dual atomization/spray-drying process of U.S. Pat. No. 4,280,851, the starch or flour was slurred at 6–10% solids in water and the pH was adjusted to the desired pH by adding a sufficient amount of 5% sodium carbonate solution until the desired pH was reached.

Except where a conventional oven or dextrinizer is specified, the test samples were dehydrated and heat treated in a fluidized bed reactor, model number FDR-100, manufactured by Procedyne Corporation of New Brunswick, N.J. The cross-sectional area of the fluidized bed reactor was 0.05 sq meter. The starting bed height was 0.3–0.8 meter, but usually 0.77 meter. The fluidizing gas was air except where otherwise indicated. When granular non-pregelatinized starches were being heat treated, the gas was used at a velocity of 5–15 meter/min. When pregelatinized granular starches were being heat treated, the gas was used at a velocity of 15–21 meter/min. The side walls of the reactor were heated with hot oil, and the fluidizing gas was heated with an electric heater. The samples were loaded into the reactor and then the fluidizing gas introduced, or the samples were loaded while the fluidizing gas was being introduced. No difference was noted in the samples in the order of loading. Unless otherwise specified, the samples were brought from ambient temperature up to no more than 125° C. until the samples became anhydrous and were further heated to the specified heat treating temperatures. When the heating temperature was 160° C., the time to reach that temperature was less than three hours.

The moisture level of the samples at the final heating temperature was 0%, except where otherwise stated. Portions of the samples were removed and tested for inhibition at the temperatures and times indicated in the tables.

These samples were tested for inhibition using the following Brabender Procedures.

Brabender Procedure—Non-Pregelatinized Granular Starches

Unless other stated, the following Brabender procedure was used. All samples, except for corn, tapioca and waxy rice flour, were slurried in a sufficient amount of distilled water to give a 5% anhydrous solids starch slurry. Corn, tapioca, and waxy rice flour were slurried at 6.3% anhydrous solids. The pH was adjusted to pH 3.0 with a sodium citrate, citric acid buffer and the slurry was introduced into the sample cup of a Brabender VISCO/Amylo/GRAPH (manufactured by C. W. Brabender Instruments, Inc., Hackensack, N.J.) fitted with a 350 cm/gram cartridge. The VISCO\Amylo\GRAPH records the torque required to balance the viscosity that develops when a starch slurry is subjected to a programmed heating cycle. The record consists of a curve tracing the viscosity through the heating cycle in arbitrary units of measurement termed Brabender Units (BU).

The starch slurry is heated rapidly to 92° C. and held for 10 minutes. The peak viscosity and viscosity ten minutes after peak viscosity were recorded in Brabender Units (BU). The percentage breakdown in viscosity (±2%) was calculated according to the formula:

$$\% \text{ Breakdown} = \frac{\text{peak} - (\text{peak} + 10')}{\text{peak}} \times 100,$$

where "peak" is the peak viscosity in Brabender units, and "(peak+10')" is the viscosity in Brabender Units at ten minutes after peak viscosity. If no peak viscosity was reached, i.e., the data indicate a rising (ris.) curve or a flat curve, the viscosity at 92° C. and the viscosity at 30 minutes after attaining 92° C. were recorded.

Using data from the Brabender curves, inhibition was determined to be present if, when dispersed at 5% or 6.3% solids in water at 92°–95°C. and pH 3, during the Brabender heating cycle, the Brabender data showed (i) no or almost no viscosity, indicating the starch was so inhibited it did not gelatinize or strongly resisted gelatinization; (ii) a continuous rising viscosity with no peak viscosity, indicating the starch was highly inhibited and gelatinized to a limited extent; (iii) a lower peak viscosity and a lower percentage breakdown in viscosity from peak viscosity compared to a control, indicating a moderate level of inhibition; or (iv) a slight increase in peak viscosity and a lower percentage breakdown compared to a control, indicating a low level of inhibition.

Characterization Of Inhibition of Non-Pregelatinized Granular Starches By Brabender Curves Characterization of a thermally-inhibited starch is made more conclusively by reference to a measurement of its Brabender viscosity after it is dispersed in water and gelatinized.

For non-inhibited starches, the cycle passes through the initiation of viscosity, usually at about 60°–70° C., the development of a peak viscosity in the range of 67°–95° C., and any breakdown in viscosity when the starch is held at an elevated temperature, usually 92°–95° C.

Inhibited starches will show a Brabender curve different from the curve of the same starch that has not been inhibited (hereinafter the control starch). At low levels of inhibition, an inhibited starch will attain a peak viscosity somewhat higher than the peak viscosity of the control, and there may be no decrease in percentage breakdown in viscosity compared to the control. As the amount of inhibition increases, the peak viscosity and the breakdown in viscosity decrease. At high levels of inhibition, the rate of gelatinization and swelling of the granules decreases, the peak viscosity disappears, and with prolonged cooking the Brabender trace becomes a rising curve indicating a slow continuing increase in viscosity. At very high levels of inhibition, starch granules no longer gelatinize, and the Brabender curve remains flat.

Brabender Procedure—Pregelatinized Granular and Non-Granular Starches

The pregelatinized thermally-inhibited starch to be tested was slurried in a sufficient amount of distilled water to give a 4.6% anhydrous solids starch slurry at pH 3 as follows: 132.75 g sucrose, 26.55 g starch, 10.8 g acetic acid, and 405.9 g water were mixed for three minutes in a standard home Mixmaster at setting #1. The slurry was then introduced to the sample cup of a Brabender VISCO/Amylo/GRAPH fitted with a 350 cm/gram cartridge and the viscosity measured as the slurry was heated to 30° C. and held for 10 minutes. The viscosity at 30° C. and 10 minutes after hold at 30° C. were recorded. The viscosity data at these temperatures are a measurement of the extent of pregelatinization. The higher the viscosity at 30° C., the grater the extent of granular swelling and hydration during the pregelatinization process.

Heating was continued to 95° C. and held at that temperature for 10 minutes.

The peak viscosity and viscosity 10 minutes after 95° C. were recorded in Brabender Units (BU). The percentage breakdown was calculated using the previous formula:

If no peak viscosity was reached, that is, the data indicated a rising curve or a flat curve, the viscosity at 95° C. and the viscosity at 10 minutes after attaining 95° C. were recorded.

Characterization of Inhibition of Pregelatinized Granular Starches by Brabender Curves As discussed above, characterization of a thermally-inhibited starch is made more conclusively by reference to a measurement of its viscosity after it is dispersed in water and gelatinized using the instrument described above.

For pregelatinized granular starches, the level of viscosity when dispersed in cold water will be dependent on the extent to which the starch was initially cooked out during the pregelatinization process. If the granules were not fully swollen and hydrated during pregelatinization, gelatinization will continue when the starch is dispersed in water and heated. Inhibition was determined by a measurement of the starch viscosity when the starch was dispersed at 4.6% solids in water at pH 3 and heated to 95° C.

When the pregelatinized granular starch had a high initial cold viscosity, meaning it was highly cooked out in the pregelatinization process, the resulting Brabender traces will be as follows: for a highly inhibited that the starch, the trace will be a flat curve, indicating that the starch is already very swollen and is so inhibited starch it is resisting any further gelatinization or the trace will be a rising curve, indicating that further gelatinization is occurring at a slow rate and to a limited extent; for a less inhibited starch, the trace will he a dropping curve, indicating that some of the granules are fragmenting, but the overall breakdown in viscosity will be lower than that for a non-inhibited control or the trace will show a second peak but the breakdown in viscosity will be lower than that for a non-inhibited control.

When the pregelatinized starch had a low initial cold viscosity, meaning it was not highly cooked out in the pregelatinization process and more cooking is needed to reach the initial peak viscosity, the resulting Brabender traces will be as follows: for a highly inhibited starch, the trace will be a rising curve, indicating that further gelatinization is occurring at a slow rate and to a limited extent; for a less inhibited starch, the trace will show a peak viscosity as gelatinization occurs and then a drop in viscosity, but with a lower percentage breakdown in viscosity than for a non-inhibited control.

If no peak viscosity was reached, that is, the data indicated a rising curve or a flat curve, the viscosity at 95° C. and the viscosity at 10 minutes after attaining 95° C. were recorded.

Characterization of Inhibition of Pregelatinized Non-Granular Starches of Brabender Curves The resulting Brabender traces will be as follows: for a highly inhibited starch the trace will be flat, indicating that the starch is so inhibited that it is resisting any further gelatinization or the trace will be a rising curve, indicating that further gelatinization is occurring at a slow rate and to a limited extent; for a less inhibited starch, the trace will show a dropping curve, but the overall breakdown in viscosity from the peak viscosity will be lower than that for a non-inhibited control.

Brabender Procedure—Crosslinked Starches

The crosslinked, thermally-inhibited cationic and amphoteric starches (23.0 g) to be tested was combined with 30 ml of an aqueous solution of citric acid monohydrate (prepared by diluting 210.2 g of citric acid monohydrate to 1000 ml in a volumetric flask) and sufficient water was added to make the total charge weight 460.0 g. The slurry is added to the cooking chamber of the Brabender VISCO amylo GRAPH fitted with a 700 cm/gram cartridge and rapidly heated from room temperature to 95° C. The peak viscosity (highest viscosity observed) and the viscosity after 30 minutes at 95° C. were recorded. The percentage breakdown in viscosity (±2%) was calculated according to the formula $$\% \text{ Breakdown} = \frac{\text{Peak} - (\text{Viscosity after 30' at 95° C.})}{\text{Peak}} \times 100$$

Characterization of Inhibition by Cooks

A dry blend of 7 g of starch or flour (anhydrous basis) and 14 g of sugar were added to 91 ml of water in a Waring blender cup at low speed, then transferred to a cook-up beaker, allowed to stand for 10 minutes, and then evaluated for viscosity, color, clarity and texture.

Some of the granular non-pregelatinized starch samples were tested for pasting temperature and/or gelatinization temperature using the following procedures.

Rapid Visco Analyzer (RVA)

This test is used to determine the onset of gelatinization, i.e., the pasting temperature. The onset of gelatinization is indicated by an increase in the viscosity of the starch slurry as the starch granules begin to swell.

A 5 g starch sample (anhydrous basis) is placed in the analysis cup of a Model RVA-4 Analyzer and slurried in water at 20% solids. The total charge is 25 g. The cup is placed into the analyzer, rotated at 160 rpm, and heated from an initial temperature of 50° C. up to a final temperature of 80° C. at a rate of 3° C. per minute. A plot is generated showing time, temperature, and viscosity in centipoises (cP). The pasting temperature is the temperature at which the viscosity reaches 500 cP. Both pasting temperature and pasting time are recorded.

Differential Scanning Calorimetry (DSC)

This test provides a quantitative measurement of the enthalpy ($\Delta H$) of the energy transformation that occurs during the gelatinization of the starch granule. The peak temperature and time required for gelatinization are recorded. A Perkin-Elmer DSC-4 differential scanning calorimeter with data station and large volume high pressure sample cells is used. The cells are prepared by weighing accurately 10 mg of starch (dry basis) and the appropriate amount of distilled water to approximately equal 40 mg of total water weight (moisture of starch and distilled water). The cells are then sealed and allowed to equilibrate overnight at 4° C. before being scanned at from 25°–150° C. at the rate of 10° C./minute. An empty cell is used as the blank.

Brookfield Viscometer Procedure

Test samples are measured using a Model RVT Brookfield Viscometer and the appropriate spindle (the spindle is selected based on the anticipated viscosity of the material). The test sample, usually a cooked starch paste or dextrin, is placed in position and the spindle is lowered into the sample to the appropriate height. The viscometer is turned on and the spindle is rotated at a constant speed (e.g., 10 or 20 rpm) for at least 3 revolutions before a reading is taken. Using the appropriate conversion factors, the viscosity (in centipoises) of the sample is recorded.

EXAMPLES

The following examples will more fully illustrate the embodiments of this invention. In the examples, all parts are given by weight and all temperatures are in degrees Celsius unless otherwise noted. The thermally-inhibited starches and controls in the following examples were prepared as described above and are defined by textural characteristics or in relation to data taken from Brabender curves using the above-described procedures. Unless otherwise specified, the thermally-inhibited starches and flours referred to as "granular" starches are non-pregelatinized granular starches and flours.

The thermally-inhibited starches and flours are referred to as "T-I" starches and flours and the conditions used for their preparation (i.e., pH to which the starch is adjusted and heat treatment temperature and time at that temperature) are included in parenthesis (pH;temperature/hold time at that temperature). All pH adjustments are done with sodium carbonate unless specified otherwise.

In the first three examples to follow, the moisture indicated is the moisture content in the starch before the dehydration and heat treating steps. As indicated above, as the starches were brought from ambient temperature up to the heating temperature, the starches became anhydrous or substantially anhydrous.

In the tables the abbreviations "sl.", "mod.", "v.", "ris." and "N.D" stand for slight or slightly,51 moderate or moderately, very, rising, and not determined.

Example 1

This example illustrates the preparation of the starches of this invention from a commercial granular waxy maize base starch by the heat treatment process of this invention.

Processing conditions and their effects on viscosity and texture of waxy maize starch are set forth in the Tables below.

To obtain a heat-stable, non-cohesive thickener, samples of granular starch were slurried in 1.5 parts of water, the pH of the slurry was adjusted with the addition of a 5% $Na_2CO_3$ solution and the slurry was agitated for 1 hour, then filtered, dried, and ground. The dry starch samples (150 g) were placed into an aluminum foil pan (4"×5"×1½") and heated in a conventional oven under the conditions described below. Brabender viscosity measurements demonstrated that the most heat-stable starches were obtained by heating at 160° C. and a pH of at least 8.0 for about 3.5 to 6.0 hours.

a non-cohesive thickener with properties similar to chemically crosslinked starches.

Processing conditions and their effects on the viscosity and texture of waxy barley, tapioca, V.O. hybrid and waxy rice starches are set forth in the tables below.

| Waxy Maize[a] | Process Variables | | | Cold Evaluation of Gelatinized Samples[d,e] | |
|---|---|---|---|---|---|
| | Heating - 160° C. | | | | |
| | pH | Moisture (%) | Time (hrs.) | Viscosity | Texture |
| 1 | 6.0 | 10.9 | 2 | heavy to v. heavy | cohesive |
| 2 | 6.0 | 10.9 | 4 | thin to mod. | — |
| 3 | 8.2 | 10.6 | 3.5 | heavy to v. heavy | cohesive, less than unmodified control |
| 4 | 8.2 | 10.6 | 4 | heavy to v. heavy | sl. to mod. cohesive |
| 5 | 8.2 | 10.6 | 4.5 | heavy | non-cohesive |
| 6 | 8.2 | 10.6 | 5.5 | heavy, thinnest | non-cohesive |
| 7 | 8.2 | 10.6 | 6 | mod. heavy | non-cohesive |
| unmodified[b] | — | — | — | v. heavy | cohesive |
| crosslinked[c] | — | — | — | v. heavy | non-cohesive |

[a]All samples were commercial samples of granular waxy maize starch obtained from National Starch and Chemical Company, Bridgewater, New Jersey.
[b]The unmodified control was a commercial granular waxy maize starch obtained from National Starch and Chemical Company, Bridgewater, New Jersey.
[c]The modified control was a commercial crosslinked (phosphorous oxychloride treated) granular waxy maize starch obtained from National Starch and Chemical Company, Bridgewater, New Jersey.
[d]Samples were cooked by slurrying 7.0 g of starch (at 12% moisture) in 91 mls water at neutral pHs and heating the starch slurry for 20 minutes in a boiling water bath.
[e]The cold evaluation was carried out at 25°C.

| | Brabender Evaluation | | | | |
|---|---|---|---|---|---|
| | Process Variables | | | Brabender Viscosity[b] (BU) | |
| Waxy Maize[a] | pH | Heating Temp. (°C.) | Time (hrs.) | Peak Viscosity | Viscosity at 95° C./ 20 mins. |
| 3 | 8.2 | 160 | 3.5 | 985 | 830 |
| 4 | 8.2 | 160 | 4.0 | 805 | 685 |
| 5 | 8.2 | 160 | 4.5 | 640 | 635 |
| 6 | 8.2 | 160 | 5.5 | 575 | 570 |
| Unmodified control | — | none | none | 1640 | 630 |
| 1 | 6.0 | 160 | 2.0 | 1055 | 560 |
| 2 | 6.0 | 160 | 4.0 | 140 | 80 |

[a]See prior Table for a description of samples.
[b]In the Brabender procedure, a sample containing 5.4% anhydrous solids of starch dispersed in water was heated rapidly to 50° C., then the heat was increased by 1.5° C. per minute to 95° C., and held for 20 minutes.

Example 2

This example illustrates that a variety of granular starches may be processed by the method of this invention to provide

| Sample[a] | Process Variables | | | Cold Evaluation of Gelatinized Sample[b] | |
|---|---|---|---|---|---|
| | Heating - 160° C. | | | | |
| | pH | Moisture (%) | Time (hrs.) | Viscosity/Texture | |
| Waxy Barley Starch | | | | | |
| 1 | 8.7 | 8.5 | 1.5 | heavy | cohesive |
| 2 | 8.7 | 8.5 | 2.5 | heavy | sl. mod. cohesive |
| 3 | 8.7 | 8.5 | 3.5 | mod. heavy to heavy | non-cohesive |
| 4 | 5.2 | 10.8 | 1.5 | thin | — |
| 5 | 5.2 | 10.8 | 2.5 | thin/ thinnest | — |
| Waxy Barley Control | — | — | 0 | heavy | cohesive |
| Tapioca Starch | | | | | |
| 6 | 8.8 | 10.3 | 2 | heavy to v. heavy | cohesive |
| 7 | 8.8 | 10.3 | 3 | heavy to v. heavy | cohesive/ less than Sample 6 |
| 8 | 8.8 | 10.3 | 4 | heavy to v. heavy | sl. cohesive to sl. lumpy |
| 9 | 8.8 | 10.3 | 5 | heavy | non-cohesive lumpy |
| 10 | 5.5 | 10.9 | 3 | mod. heavy | — |
| Tapioca Control | — | — | 0 | v. heavy | cohesive |
| Waxy Rice Starch | | | | | |
| 1 | 9.1 | 9.0 | 2 | v. heavy | cohesive |
| 2 | 9.1 | 9.0 | 3 | heavy | sl. cohesive |
| 3 | 9.1 | 9.0 | 4 | heavy | sl. cohesive |
| 4 | 9.1 | 9.0 | 5 | mod. heavy to heavy | non-cohesive |
| Waxy Rice Control | — | — | 0 | v. heavy | cohesive |

[a]Tapioca starch samples were commercial granular starch obtained from National Starch and Chemical Company, Bridgewater, New Jersey. Waxy barley starch samples were commercial granular starch obtained from AlKo, Finland. Waxy rice starch samples were commercial granular starch obtained from Mitsubishi Corporation, Japan.
[b]Samples were cooked by slurrying 7.5 g of starch at 12% moisture in 100 mls of water and heating the starch slurry for 20 minutes in a boiling water bath.

Process Variables

| | | Heating - 160° C. | | Cold Evaluation of Gelatinized Sample[b] | |
|---|---|---|---|---|---|
| Sample[a] | pH | Moisture (%) | Time (hrs.) | Viscosity/Texture | |
| V.O. Hybrid Starch | | | | | |
| 1 | 8.7 | 10.5 | 2.0 | heavy | cohesive v. sl. less than control |
| 2 | 8.7 | 10.5 | 3.0 | heavy | sl. mod. cohesive |
| 3 | 8.7 | 10.5 | 4.0 | mod. heavy to heavy | smooth, very sl. cohesive |
| 4 | 8.7 | 10.5 | 5.0 | mod. heavy | smooth, short, non-cohesive |
| 5 | 8.7 | 10.5 | 6.0 | moderate | smooth, short, non-cohesive |
| V.O. Hybrid Control | 5.9 | 11.4 | 0 | heavy | cohesive |

[a]V.O. hybrid starch samples were granular starches obtained from National Starch and Chemical Company, Bridgewater, New Jersey.
[b]Samples were cooked by slurrying 7.5 g of starch at 12% moisture in 100 mls of water and heating the starch slurry for 20 minutes in a boiling water bath.

The viscosity and texture evaluation results show that a non-cohesive, heat-stable starch thickener may be prepared from waxy barley, V.O. hybrid, tapioca and waxy rice starches by the process of this invention. The amount of inhibition (non-cohesive, thickening character in cooked aqueous dispersion) increased with increasing time of heat treatment.

Example 3

This example illustrates the effects of temperature, the pH, and starch moisture content on the viscosity and texture of the treated starch.

Part A

A waxy maize starch sample (100 g) containing 20.4% moisture was heated in an oven at 100° C. for 16 hours in a sealed glass jar. A second sample was heated for 4 hours and a third sample was heated for 7 hours under the same conditions. The product viscosity and texture were compared to a 12.1% moisture granular waxy maize starch control using the cook evaluation method of Example 1.

The results are shown in the table below.

Effect of Process Moisture

| | Process Variables[b] | Cold Evaluation of Gelatinized Starch[c] | |
|---|---|---|---|
| Waxy Maize[a] | Heat Time (hrs.) | Viscosity | Texture |
| 1. Test (20.4% H₂O) | 16 | heavy, sl. thinner than control | cohesive |
| 2. Control (12.1% H₂O) | 0 | heavy | cohesive |
| 3. Test (20.4% H₂O) | 4 | heavy | cohesive |
| 4. Control (12.1% H₂O) | 0 | heavy | cohesive |
| 5. Test (20.4% H₂O) | 7 | heavy | cohesive |
| 6. Control (12.1% H₂O) | 0 | heavy | cohesive |

[a]Samples were obtained from National Starch and Chemical Company, Bridgewater, New Jersey.
[b]Process was conducted at pH 5.2.
[c]See Example 2 for cook conditions.

The results demonstrate that moisture added during the process yields a product which is as cohesive and undesirable as a control starch which had not been heated.

Part B

Samples (900 g) of a commercial granular waxy maize starch (obtained from National Starch and Chemical Company, Bridgewater, N.J.) were placed in a 10"×15"×0.75" aluminum tray and heated in an oven at 180° C. for 15, 30, 45 and 60 minutes. The pH of the starch was not adjusted and remained at about 5.2 during the heating process. Sample viscosity and texture were evaluated by the method of Example 1.

As shown below, the pH 5.2 samples were characterized by an undesirable, cohesive texture similar to that of a waxy maize starch control which had not been heat treated.

Effect of Acidic Process pH

| | Process Variables[a] | Cold Evaluation of Gelatinized Starch[b] | |
|---|---|---|---|
| Sample | Heating Time (minutes) | Viscosity | Texture |
| 1 | 15 | v. heavy | cohesive |
| 2 | 30 | v. heavy | cohesive |
| 3 | 45 | v. heavy | cohesive |
| 4 | 60 | heavy to v. heavy | cohesive |
| control | 0 | v. heavy | cohesive |

[a]The pH was not adjusted from that of the native waxy maize starch (a pH = 5.2) and Samples 1-4 correspond to starch treated by the process of U.S. Pat. No. 4,303,451 (no pH adjustment).
[b]See Example 2 for cook conditions.

Thus, a combination of selected factors, including the pH, moisture content and the type of native starch, determine whether a desirable, non-cohesive, heat-stable starch thickener is produced by the process of this invention.

Example 4

This example shows carrying out the thermal inhibition in the fluidized bed previously described. The effects of temperature and time at the indicated temperature on the level of inhibition of waxy maize granular starch at pH 9.5 are shown below.

| Heating Temperature and Time | Viscosity (B.U.) | | |
|---|---|---|---|
| | Peak | Peak +10' | Break- down (%) |
| Control (none) | 1135 | 730 | 64.3 |
| 110° C. for 22 hrs. | 1185 | 970 | 18.1 |
| 160° C. for 0 hr. | 1055 | 880 | 16.6 |
| 160° C. for 2 hrs. | 665 | 660 | 0.7 |
| 175° C. for 0 hr. | 850 | 755 | 11.2 |
| 180° C. for 0 hr. | 715 | 680 | 4.9 |
| 190° C. for 0 hr. | 555 | 550 | 0.9 |
| 200° C. for 0 hr. | ris. | — | — |
| 200° C. for 2 hrs. | none | — | — |

The data shows that inhibited anhydrous or substantially anhydrous samples can be obtained at heat treating temperatures between 100°–200° C., with more inhibition obtained at higher temperatures or at longer times at lower temperatures. The starch samples heated at 200° C. were highly inhibited (rising curves) or completely inhibited (no gelatinization).

Example 5

Samples of a high amylose starch (Hylon V—50% amylose) at its natural pH and pH 9.5 were evaluated for the effect of the high amylose content on inhibition. The starches were thermally-inhibited at 160° C. in the fluidized bed for the indicated time. Due to the high levels of amylose, it was necessary to use a pressurized Visco/amylo/Graph (C. W. Brabender, Hackensack, N.J.) to obtain Brabender curves. Samples were slurried at 10% starch solids, heated to 120° C., and held for 30 minutes.

The results are shown below:

| | Natural PH Viscosity (BU) | | | pH 9.5 Viscosity (BU) | | |
|---|---|---|---|---|---|---|
| | Peak | Peak +10' | Break- down (%) | Peak | Peak +10' | Break- down (%) |
| Control | 1180 | 525 | 55.5 | 1180 | 525 | 55.5 |
| T-I (0 min.) | 700 | 235 | 66 | | | |
| T-I (120 min.) | 282 | 25 | 91 | 290 | 225 | 22 |

The data show that inhibition was obtained only on the high pH sample.

Example 6

This example shows the preparation of pregelatinized granular, thermally-inhibited waxy maize starches. The pregelatinization step was carried out prior to the thermal inhibition. The fluidized bed described previously was used.

Starch slurries (30–40% solids), pH adjusted to 6, 8, and 10, were pregelatinized in a pilot size spray drier (Type-1-KA#4F, from APV Crepaco, Inc., Dryer Division, of Attle Boro Falls, Mass.) using a spray nozzle, Type ½ J, from Spraying Systems Company of Wheaton, Ill. The spray nozzle had the following configuration: fluid cap, 251376, and air cap, 4691312.

The resulting high and low viscosity pregelatinized granular starches were dehydrated and heat treated at the temperature and time indicated. The thermally-inhibited starches were evaluated for inhibition using the Brabender procedure previously described.

The results are shown below:

| Heat Treatment Conditions | Viscosity (B.U.) | | | | | |
|---|---|---|---|---|---|---|
| | 30° C. | 30° C. +10' | Peak | 95° C. | 95° C. +10' | Breakdown (%) |
| pH 6.0 - High Initial Viscosity | | | | | | |
| Control | 1280 | 960 | 960 | 170 | 90 | 91 |
| 160° C. for 0 min. | 700 | 980 | 700 | 610 | 370 | 47 |
| 160° C. for 30 min. | 600 | 910 | 720 | 690 | 370 | 49 |
| 160° C. for 90 min. | 450 | 780 | 915 | 740 | 400 | 56 |
| 160° C. for 150 min. | 360 | 590 | 925 | 800 | 500 | 46 |
| pH 6.0 - Low Initial Viscosity | | | | | | |
| Control | 230 | 250 | 750 | 340 | 100 | 87 |
| 160° C. for 30 min. | 100 | 130 | 600 | 370 | 210 | 65 |
| 160° C. for 60 min. | 100 | 140 | 730 | 500 | 260 | 64 |
| 160° C. for 120 min. | 100 | 130 | 630 | 430 | 260 | 59 |
| 160° C. for 180 min. | 90 | 120 | 550 | 390 | 240 | 56 |
| pH 8.0 - High Initial Viscosity | | | | | | |
| Control | 1400 | 1020 | 1020 | 270 | 100 | 90 |
| 160° C. for 0 min. | 700 | 1060 | 1050 | 760 | 280 | 73 |
| 160° C. for 60 min. | 260 | 600 | 1340 | 1200 | 780 | 42 |
| 160° C. for 90 min. | 240 | 440 | 1280 | 1240 | 1000 | 22 |
| 160° C. for 120 min. | 280 | 420 | 1320 | 1320 | 1280 | 3 |
| 160° C. for 150 min. | 120 | 200 | 860 | 860 | 820 | 7 |
| 160° C. for 180 min. | 180 | 260 | 980 | 980 | 920 | 8 |
| pH 8.0 - Low Initial Viscosity | | | | | | |
| Control | 250 | 250 | 820 | 340 | 130 | 84 |
| 160° C. for 0 min. | 50 | 100 | 690 | 460 | 270 | 61 |
| 160° C. for 60 min. | 40 | 50 | 840 | 590 | 320 | 62 |
| 160° C. for 120 min. | 20 | 30 | 720 | 650 | 450 | 38 |

-continued

| Heat Treatment Conditions | Viscosity (B.U.) | | | | | Breakdown (%) |
|---|---|---|---|---|---|---|
| | 30° C. | 30° C. +10' | Peak | 95° C. | 95° C. +10' | |
| 160° C. for 180 min. | 20 | 30 | 590 | 570 | 450 | 24 |
| pH 10 - High Initial Viscosity | | | | | | |
| Control | 1010 | 740 | 1010 | 300 | 160 | 84 |
| 140° C. for 0 min. | 550 | 850 | 1280 | 1080 | 750 | 41 |
| 150° C. for 0 min. | 270 | 420 | 1680 | 1680 | 1540 | 8 |
| 160° C. for 0 min. | 170 | 240 | — | 1180 | 1440 | ris. |
| 160° C. for 30 min. | 80 | 85 | — | 410 | 650 | ris. |
| 160° C. for 60 min. | 60 | 60 | — | 150 | 300 | ris. |
| 160° C. for 90 min. | 50 | 50 | — | 80 | 140 | ris. |
| 120° C. for 120 min. | 40 | 40 | — | 80 | 130 | ris. |
| 150° C. for 150 min. | 40 | 40 | — | 60 | 90 | ris. |
| 160° C. for 160 min. | 40 | 40 | — | 45 | 70 | ris. |
| pH 10 - Low Initial Viscosity | | | | | | |
| Control | 200 | 190 | 615 | 350 | 190 | 69 |
| 130° C. for 0 min. | 110 | 180 | 1500 | 880 | 530 | 65 |
| 150° C. for 0 min. | 50 | 80 | 1670 | 1540 | 1250 | 25 |
| 160° C. for 0 min. | 30 | 30 | — | 1040 | 1320 | ris. |
| 160° C. for 30 min. | 30 | 30 | — | 380 | 640 | ris. |
| 160° C. for 60 min. | 30 | 30 | — | 150 | 310 | ris. |
| 160° C. for 90 min. | 10 | 10 | — | 50 | 120 | ris. |

The results show some thermal inhibition was attained in all the dehydrated and heat treated pregelatinized granular starches and that increasing the initial pH and the heat treatment time increased the level of inhibition. For the samples at pH 6.0, at 0 and 30 minutes, the recorded peak was actually a second peak obtained after the initial high viscosity began to breakdown. For some of the samples at pH 10, no peak viscosity was reached, indicating a highly inhibited starch.

Example 7

This example describes the preparation of thermally-inhibited pregelatinized granular starches from additional starch bases as well as a waxy maize starch. The granular starches were adjusted to the indicated pH, pregelatinized using the procedure previously described, and heat treated in an oven at 140° C. for the indicated time. The cook evaluation and Brabender results are shown below.

| | | Cook Evaluation | |
|---|---|---|---|
| pH | Heat Treatment Hours at 140° C. | Viscosity of Cook | Texture of Cook |
| Waxy Maize | | | |
| 6 | 2 | mod. | sl. cohesive, smooth |
| 6 | 4 | mod. to thin | sl. cohesive, smooth |
| 6 | 6 | mod. | v. sl. cohesive, smooth |
| 6 | 8 | mod. | v. sl. cohesive, smooth |
| 8 | 2 | mod. | cohesive, smooth |
| 8 | 4 | mod. to heavy | sl. cohesive, smooth |
| 8 | 6 | mod. | v. sl. cohesive, smooth |
| 8 | 8 | mod. | v. sl. cohesive, smooth |
| 10 | 2 | mod. | sl. cohesive, smooth |

-continued

| | | Cook Evaluation | |
|---|---|---|---|
| pH | Heat Treatment Hours at 140° C. | Viscosity of Cook | Texture of Cook |
| 10 | 4 | mod. to heavy | non-cohesive, short, smooth |
| 10 | 6 | mod. | non-cohesive, short, smooth |
| 10 | 8 | mod. | non-cohesive, short, smooth |
| Tapioca | | | |
| 6 | 2 | mod. to heavy | v. cohesive, long |
| 6 | 4 | mod. to heavy | cohesive |
| 6 | 6 | mod. | sl. cohesive, smooth |
| 6 | 8 | mod. | non-cohesive, short, smooth |
| 8 | 2 | mod. to heavy | v. cohesive |
| 8 | 4 | mod. to heavy | cohesive |
| 8 | 6 | mod. to heavy | non-cohesive, short, smooth |
| 8 | 8 | mod. to heavy | non-cohesive, short, smooth |
| 10 | 2 | mod. to heavy | cohesive, long |
| 10 | 4 | mod. to heavy | v. sl. cohesive, smooth |
| 10 | 6 | mod. | non-cohesive, short, smooth |
| 10 | 8 | mod. to heavy | non-cohesive, short, smooth |
| Potato | | | |
| 6 | 2 | heavy to v. heavy | v. cohesive, long |
| 6 | 4 | heavy | cohesive |
| 6 | 6 | mod. to heavy | sl. cohesive |
| 6 | 8 | mod. to heavy | v. sl. cohesive |
| 8 | 2 | heavy to v. heavy | v. cohesive, long |
| 8 | 4 | v. heavy | sl. cohesive |
| 8 | 6 | heavy | non-cohesive, sl. set, smooth |

-continued

Cook Evaluation

| pH | Heat Treatment Hours at 140° C. | Viscosity of Cook | Texture of Cook |
|----|---|---|---|
|    | 8 | mod. | non-cohesive, v. sl. set, smooth |
| 10 | 2 | heavy | v. cohesive |
| 10 | 4 | heavy to mod. | sl. cohesive, v. sl. set, smooth |
| 10 | 6 | heavy to mod. | non-cohesive, short, mod. set, smooth |
| 10 | 8 | heavy to mod. | non-cohesive, short, mod. set, smooth |

| Heat Treatment Conditions | Viscosity (BU) | | | | | Breakdown (%) |
|---|---|---|---|---|---|---|
|  | 30° C. | 30° C. + 10' | Peak | 95° C. | 95° C. + 10' |  |
| Waxy Maize at pH 8 and 140° C. | | | | | | |
| 2 hrs | 400 | 1115 | 1115 | 515 | 515 | 60 |
| 6 hrs | 400 | 955 | 1120 | 1120 | 1023 | 38 |
| Tapioca at pH 8 and 140° C. | | | | | | |
| 2 hrs | 1140 | 2685 | 2685 | 2685 | 880 | 78 |
| 6 hrs | 370 | 800 | 1110 | 1110 | 890 | 46 |

The results show that thermally-inhibited pregelatinized granular starches can be prepared using other starch bases and that for non-cohesive starches longer times and/or higher pHs are required when an oven rather than a fluidized bed is used for the dehydration and heat treatment.

Example 8

This example shows the preparation of pregelatinized, non-granular starches which were pregelatinized by drum-drying and then thermally inhibited.

Samples of waxy maize, tapioca and potato starches, at pH 6, 8, and 10, were pregelatinized by drum-drying. The samples were placed in a 140° C. oven, dehydrated to anhydrous, and heat treated at 140° C. for the indicated times.

The viscosity and textural characteristics of the thermally-inhibited starches are set out below.

| Time | Cook Viscosity | Cook Texture |
|---|---|---|
| Waxy Maize - pH 6 | | |
| 2 hrs | heavy | v. cohesive, pulpy |
| 4 hrs | heavy to v. heavy | cohesive, pulpy |
| 6 hrs | heavy | sl. cohesive, pulpy |
| 8 hrs | mod. to heavy | v. sl. cohesive, pulpy |
| Waxy Maize - pH 8 | | |
| 2 hrs | heavy | v. cohesive, pulpy |
| 4 hrs | heavy | sl. cohesive, pulpy |
| 6 hrs | mod. to heavy | v. sl. cohesive, pulpy |
| 8 hrs | mod. to heavy | v. sl. cohesive, pulpy |
| Waxy Maize - pH 10 | | |
| 2 hrs | heavy | cohesive, pulpy |
| 4 hrs | heavy to mod. | v. sl. cohesive, pulpy |
| 6 hrs | mod. | non-cohesive, short, pulpy |
| 8 hrs | mod. | non-cohesive, short, pulpy |
| Tapioca - pH 6 | | |
| 2 hrs | v. heavy | cohesive, pulpy |
| 4 hrs | heavy to v. heavy | sl. cohesive, pulpy |
| 6 hrs | mod. heavy | sl. cohesive, pulpy |
| 8 hrs | heavy | sl. cohesive, pulpy |
| Tapioca - pH 8 | | |
| 2 hrs | heavy to v. heavy | v. cohesive, pulpy |
| 4 hrs | heavy | v. cohesive, pulpy |
| 6 hrs | N.D. | N.D. |
| 8 hrs | heavy | v. sl. cohesive, pulpy |
| Tapioca 10 - pH | | |
| 2 hrs | heavy | cohesive, pulpy |
| 4 hrs | heavy to v. heavy | sl. cohesive, pulpy |
| 6 hrs | heavy | non-cohesive, short, pulpy |
| 8 hrs | mod. heavy | non-cohesive, short, pulpy |
| Potato - pH 6 | | |
| 2 hrs | heavy to v. heavy | cohesive, pulpy |
| 4 hrs | heavy | cohesive, pulpy |
| 6 hrs | mod. to heavy | cohesive, pulpy |
| 8 hrs | mod. to heavy | cohesive, pulpy |
| Potato - pH 8 | | |
| 2 hrs | heavy to v. heavy | v. cohesive, pulpy |
| 4 hrs | v. heavy | cohesive, pulpy |
| 6 hrs | v. heavy | cohesive, pulpy |
| 8 hrs | v. heavy | cohesive, pulpy |
| Potato - pH 10 | | |
| 2 hrs | heavy to v. heavy | v. cohesive, pulpy |
| 4 hrs | v. heavy | slight set, sl. chunky |
| 6 hrs | heavy | slight set, sl. chunky |
| 8 hrs | mod. heavy | moderate set, sl. chunky |

Brabenders were run on some of the above starches. The results are shown below.

|  | Viscosity (B.U.) | | | | | |
| --- | --- | --- | --- | --- | --- | --- |
|  | 30° C. | 30° C. +10' | Peak | 95° C. | 95° C. +10' | Breakdown (%) |
| Waxy Maize - pH 8 | | | | | | |
| 2 hrs. | 665 | 3000 | 4620 | 1120 | 300 | 94 |
| 6 hrs. | 700 | 1640 | 2445 | 2440 | 1900 | 22 |
| Tapioca - pH 8 | | | | | | |
| 2 hrs. | 1500 | 3170 | 3290 | 680 | 600 | 82 |
| 6 hrs. | 1180 | 1870 | 1873 | 780 | 600 | 68 |

The results show that longer heating times and/or higher pHs are required to prepare non-cohesive starches at 140° C. It is expected that heating at 160° C., preferably in a fluidized bed, will provide non-cohesive starches.

Example 9

This example shows the preparation of another pregelatinized non-granular starch which was jet-cooked, spray-dried, and then thermally inhibited.

A granular high amylose starch (50% amylose) was jet-cooked and spray-dried using the continuous coupled jet-cooking/spray-drying process described in U.S. Pat. No. 5,131,953 and then thermally inhibited for 8 hours at 140° C. The jet-cooking/spray-drying conditions used were as follows: slurry—pH 8.5–9.0; cook solids—10%; moyno setting—about 1.5; cooking temperature—about 145° C.; excess steam—20%; boiler pressure—about 85 psi; back pressure—65 psi; spray-dryer—Niro dryer; inlet temperature—245° C.; outlet temperature—115° C.; atomizer—centrifugal wheel. The pregelatinized non-granular starch was adjusted to pH 8.7 and dehydrated and heat treated for 8 hours in an oven at 140° C. The characteristics of the resulting thermally-inhibited starches are set out below.

Example 10

The example shows that thermally-inhibited waxy maize starches can be prepared by drum drying the starches prior to thermal inhibition. The resulting non-granular thermally-inhibited drum-dried starches are compared with the non-granular thermally-inhibited waxy maize starches prepared by the continuous coupled jet-cooking and spray-drying process used in Example 9 and with granular thermally-inhibited starches prepared by the dual atomization/spray drying process described in U.S. Pat. No. 4,280,251 (which was used in Example 6). The conditions used for the oven dehydration and heat treatment were 9 hours at 140° C.

The characterization of the resulting thermally-inhibited pregelatinized starches is shown below.

|  | Viscosity (BU) | | | | | |
| --- | --- | --- | --- | --- | --- | --- |
|  | 30° C. | 30° C. + 10' | Peak | 95° C. | 95° C. + 10' | Breakdown (%) |
| Control | 200 | 195 | 245 | 245 | 130 | 47 |
| High Amylose | 350 | 240 | 420 | 410 | 335 | 20 |

The results show that even a high amylose starch can be inhibited. There was less breakdown for the thermally-inhibited starch and the overall viscosity was higher.

|  | Viscosity (BU) | | | | | |
| --- | --- | --- | --- | --- | --- | --- |
|  | 30° C. | 30° C. + 10' | Peak | 95° C. | 95° C. + 10' | Breakdown (%) |
| Drum-Dried/Non-Granular T-I Waxy Maize (pH 8) | | | | | | |
| Control | 640 | 2770 | 3530 | 1690 | 1550 | 56 |
| T-I | 700 | 1640 | 2440 | 2365 | 1860 | 24 |
| Jet-Cooked/Spray-Dried/Non-Granular T-I Waxy Maize - pH 8 | | | | | | |
| Control | 60 | 90 | 100 | 41 | 30 | 70 |
| T-I | 485 | 1540 | 1545 | 1330 | 1230 | 20 |
| Steam Atomized/Spray-Dried/Granular T-I Waxy Maize - pH 8 | | | | | | |
| Control | 100 | 1010 | 1080 | 340 | 170 | 84 |
| T-I | 360 | 950 | 970 | 860 | 650 | 33 |

The results show that after 8 hours heat treatment at 140° C. all the pregelatinized thermally-inhibited starches showed much less breakdown. The results also show that a higher degree of inhibition along with a higher peak viscosity can be obtained if the starch granules are completely disrupted as by drum drying or jet cooking.

Example 11

Waxy maize, tapioca, and potato starches were adjusted to pH 8 and drum dried (DD) before and after being thermally inhibited (T-I) by dehydrating and heat treating at 140° C. for 8 hours.

The Brabender results are shown below.

| Conditions | | | Viscosity (BU) | | | | | |
| --- | --- | --- | --- | --- | --- | --- | --- | --- |
|  |  |  | 30° C. | 30° C. +10' | Peak | 95° C. | 95° C. +10' | Breakdown (%) |
| Waxy Maize - pH 8 | | | | | | | | |
| Control | — | — | 640 | 2770 | 3530 | 380 | 122 | 97 |
| T-I Starch | DD/TI | — | 642 | 1080 | 1700 | 1670 | 1510 | 11 |
| T-I Starch | — | TI/DD | 650 | 2040 | 2850 | 840 | 480 | 83 |
| Tapioca -pH 8 | | | | | | | | |
| Control | — | — | 500 | 2600 | 2800 | 185 | 45 | 98 |
| T-I Starch | DD/TI | — | 720 | 1165 | 1170 | 730 | 570 | 51 |
| T-I Starch | — | TI/DD | 590 | 1345 | 1365 | 530 | 370 | 73 |
| Potato - pH8 | | | | | | | | |
| Control | — | — | 170 | 1355 | 1395 | 185 | 75 | 95 |
| T-I Starch | DD/TI | — | 380 | 935 | 1035 | 965 | 740 | 29 |
| T-I Starch | — | TI/DD | 390 | 990 | 1010 | 610 | 450 | 55 |

DD/TI indicates that the drum drying was carried out before the thermal inhibition (dehydrating and heat treating at 140° C. for 8 hrs).
TI/DD indicates that the thermal inhibition (dehydrating and heat treating at 140° C. for 8 hrs) was carried out before the drum drying.

The results show that thermally-inhibited starches can be prepared when the drum drying is carried out after the thermal inhibition.

Example 12

This example shows that a granular starch can be dehydrated by ethanol (EtOH) extraction and that a better tasting starch is obtained.

A granular waxy maize starch was slurried in 1.5 parts water based on the weight of the starch and adjusted to pH 7 and 9.5 with 5% sodium carbonate, held for 30 minutes, filtered, and dried on a tray to a moisture content of about 5–6% moisture. The starch having the pH of 5.3 was a native starch which was not pH adjusted.

For the dehydration, the dried pH 5.3, pH 7.0, and pH 9.5 starches were each separated into two samples. One sample was dried on trays in a forced draft oven at 80° C. overnight to thermally dehydrate the starch to <1% (0%) moisture. The other sample was placed in a Soxhlet extractor and allowed to reflux overnight (about 17 hours) with anhydrous ethanol (boiling point 78.32° C.). The ethanol-extracted sample was placed on paper so that the excess alcohol could flash off which took about 30 minutes. The ethanol-extracted starch was a free flowing powder which was dry to the touch.

For the heat treatment, the oven-dehydrated starches and ethanol-extracted starches were placed on trays in a forced draft oven and heated for 3, 5, and 7 hours at 160° C.

The thermally-inhibited (T-I) starches and the controls were evaluated using the Brabender Procedure previously described was used. The results are shown below:

BRABENDER RESULTS

| Starch | Dehydration Method | Heat Treatment (160° C.) | Viscosity (BU) Peak | Viscosity (BU) Peak + 10' | Breakdown (%) |
|---|---|---|---|---|---|
| Waxy Maize (pH 5.3) | | | | | |
| Control | — | — | 1245 | 330 | 74 |
| Dehydrated | oven | — | 1290 | 350 | 73 |
| Dehydrated | ethanol | — | 1205 | 245 | 80 |
| T-I | oven | 5 hrs. | 95 | 45 | 53 |
| T-I | ethanol | 5 hrs. | 255 | 185 | 28 |
| T-I | oven | 7 hrs. | 60 | 35 | 42 |
| T-I | ethanol | 7 hrs. | 165 | 105 | 36 |
| Waxy Maize (pH 7.0) | | | | | |
| Dehydrated | oven | — | 1240 | 380 | 69 |
| T-I | oven | 7 hrs. | 298 | 240 | 20 |
| T-I | ethanol | 7 hrs. | 400 | 310 | 23 |
| Waxy Maize (pH 9.5) | | | | | |
| Dehydrated | oven | — | 1250 | 400 | 68 |
| Dehydrated | ethanol | — | 1070 | 350 | 67 |
| T-I | ethanol | 3 hrs. | 665 | 635 | 5 |
| T-I | oven | 3 hrs. | 680 | 655 | 4 |
| T-I | oven | 5 hrs. | 245 | 460 | ris. |
| T-I | ethanol | 5 hrs. | 160 | 375 | ris. |
| T-I | oven | 7 hrs. | 110 | 295 | ris. |
| T-I | ethanol | 7 hrs. | 110 | 299 | ris. |

The results show that the starches can be dehydrated by ethanol extraction. The results also show that dehydration without the subsequent heat treatment did not inhibit the starch. The viscosity breakdown was not significantly different from that of the native waxy maize starch. Both of the thermally-inhibited pH 7 starches were higher in viscosity than the pH 5.3 (as is) thermally-inhibited starches. The starches which were thermally-inhibited at pH 9.5 were moderately highly inhibited or highly inhibited (rising curve).

Example 13

Granular tapioca, corn, and waxy rice starches and waxy rice flour were adjusted to pH 9.5, dehydrated in an oven and by extraction with ethanol, and heat treated at 160° C. for the indicated time. They were evaluated for Brabender viscosity using the procedure previously described.

The Brabender results are shown below.

| Starch | Dehydration Method | Heat Treatment Time | Viscosity (BU) Peak | Viscosity (BU) Peak + 10' | Breakdown (%) |
|---|---|---|---|---|---|
| Tapioca (pH 9.5 and 160° C.) | | | | | |
| Dehydrated | oven | — | 745 | 330 | 58 |
| Dehydrated | ethanol | — | 720 | 330 | 54 |
| T-I | oven | 5 hrs. | 270 | 260 | 3 |
| T-I | ethanol | 5 hrs. | 260 | 258 | 1 |
| T-I | oven | 7 hrs. | 110 | 155 | ris. |
| T-I | ethanol | 7 hrs. | 100 | 145 | ris. |
| Corn (pH 9.5 and 160° C.) | | | | | |
| Dehydrated | oven | — | 330 | 280 | 15 |
| Dehydrated | ethanol | — | 290 | 250 | 14 |
| T-I | oven | 5 hrs. | 10 | 80 | ris. |
| T-I | ethanol | 5 hrs. | 10 | 170 | ris. |
| T-I | oven | 7 hrs. | 10 | 65 | ris. |
| T-I | ethanol | 7 hrs. | 10 | 45 | ris. |
| Waxy Rice (pH 9.5 and 160° C.) | | | | | |
| Dehydrated | oven | — | 1200 | 590 | 50.8 |
| Dehydrated | ethanol | — | 1155 | 450 | 61.0 |
| T-I | oven | 5 hrs. | 518 | 640 | ris. |
| T-I | oven | 7 hrs. | 265 | 458 | ris. |
| T-I | ethanol | 7 hrs. | 395 | 520 | ris. |
| Waxy Rice Flour (pH 9.5 and 160° C.) | | | | | |
| Dehydrated | oven | — | 895 | 700 | 22 |
| Dehydrated | ethanol | — | 870 | 410 | 53 |
| T-I | oven | 5 hrs. | 38 | 73 | ris. |
| T-I | ethanol | 5 hrs. | 140 | 260 | ris. |
| T-I | oven | 7 hrs. | 10 | 16 | ris. |
| T-I | ethanol | 7 hrs. | 40 | 100 | ris. |

The results show that pH 9.5-adjusted, ethanol-extracted, heat-treated tapioca and corn starches had viscosity profiles generally similar to those of the same thermally-inhibited starches which were oven-dehydrated. The 7 hours heat-treated samples were more inhibited than the 5 hour heat-treated samples.

Example 14

This example compares ethanol extracted granular waxy maize starches and oven-dehydrated granular waxy maize starches heat treated in an oven for 5 and 7 hours at 160° C. at the same pH, i.e., pH 8.03.

The Brabender results are shown below.

| Dehydration/ Heat Treatment | Viscosity (BU) Peak | Peak + 10' | Breakdown (%) |
|---|---|---|---|
| Oven/None | 1160 | 360 | 69 |
| EtOH/None | 1120 | 370 | 67 |
| Oven/5 hrs. | 510 | 455 | 11 |
| EtOH/5 hrs. | 490 | 445 | 9 |
| Oven/7 hrs. | 430 | 395 | 8 |
| EtOH/7 hrs. | 360 | 330 | 8 |

The thermally-inhibited starches were slurried at 6.6% solids (anhydrous basis), pH adjusted to 6.0–6.5, and then cooked out in a boiling water bath for 20 minutes. The resulting cooks were allowed to cool and then evaluated for viscosity, texture, and color.

| Dehydration Method | Time at 160° C. | Viscosity | Texture | Color |
|---|---|---|---|---|
| Oven | None | heavy to v. heavy | cohesive | sl. off-white |
| Ethanol | None | heavy to v. heavy | cohesive | sl. off-white |
| Oven | 5 hours | mod. heavy to heavy | non-cohesive, smooth | sl. tan, darker* |

| Dehydration Method | Time at 160° C. | Viscosity | Texture | Color |
|---|---|---|---|---|
| Ethanol | 5 hours | mod. heavy to heavy | non-cohesive, smooth | sl. tan |
| Oven | 7 hours | mod. heavy to heavy | non-cohesive, smooth | mod. tan, darker* |
| Ethanol | 7 hours | mod. heavy to heavy | non-cohesive, smooth | mod. tan |

*Slightly darker than ethanol-dehydrated samples.

These Brabender results show that highly inhibited starches can be obtained by both thermal and non-thermal dehydration. The cook evaluation results show that there is a benefit for the ethanol-dehydrated, thermally-inhibited starches in terms of reduced color. As will be shown hereafter, there is also a flavor improvement with ethanol dehydration.

Example 15

A granular waxy maize starch was pH adjusted to pH 9.5 as previously described. The starch was then placed in a freeze dryer and dried for 3 days until it was anhydrous (0% moisture). The freeze-dried (FD) starch was heat treated for 6 and 8 hours at 160° C. in a forced draft oven.

Brabender evaluations were run. The results are shown below:

| | | Viscosity (BU) | | |
|---|---|---|---|---|
| Waxy Maize (pH 9.5) | Time at 160° C. | Peak | Peak + 10' | Breakdown (%) |
| Control | — | 1260 | 320 | 75 |
| F.D. | — | 1240 | 320 | 74 |
| T-I | 6 hrs. | 340 | 465 | ris. |
| T-I | 8 hrs. | 285 | 325 | ris. |

The results show that the starch can be dehydrated by freeze drying and that the subsequent heat treatment is necessary to inhibit the starch. The starches are highly inhibited as shown by their rising viscosity.

Example 16

This example shows that thermal inhibition reduced the gelatinization temperature of the granular waxy maize starches.

The gelatinization temperature of an untreated waxy maize, a thermally-inhibited (T-I) waxy maize (pH adjusted and not pH adjusted), and chemically-crosslinked (X-linked) waxy maize starches (0.02%, 0.04%, and 0.06% phosphorus oxychloride) were determined by Differential Scanning Calorimetry. The starches were thermally dehydrated and heat treated in an oven for the indicated time and temperature.

The peak gelatinization temperature and enthalpy (ΔH) are shown below.

| Waxy Maize | Peak Gelatinization Temperature (°C.) | Enthalpy (cal/g) |
|---|---|---|
| Unmodified | 74 | 4.3 |
| T-I (pH 9.5; 160° C. for 8.5 hrs.) | 68 | 2.9 |
| T-I Waxy Maize (pH 6; 160° C. for 8 hrs.) | 59 | 2.8 |
| X-linked (0.02% POCl₃) | 73 | 4.4 |
| X-linked (0.04% POCl₃) | 72 | 4.2 |
| X-linked (0.06% POCl₃) | 74 | 4.2 |

The results show that there was a significant reduction in peak gelatinization temperature of the thermally inhibited (T-I) starches. The heat treatment reduced the enthalpy (ΔH) from 4.3 cal/g for the unmodified starch to 2.8–2.9 cal/g for the thermally-inhibited starch. The chemically crosslinked (X-linked) starches are essentially identical to the unmodified waxy starch in peak temperature (72°–74° C. vs. 74° C.) and enthalpy (4.2–4.4 vs 4.3 cal/g). The reduced gelatinization temperature suggests that the overall granular structure has been altered by the dehydration and heat treatment.

Example 17

This example shows that the thermal inhibition may begin as early as 110° C. (230° F.), that it is substantially noticeable at 160° (320° F.), and that the gelatinization is unchanged or reduced. Granular waxy maize starches were pH adjusted to 7.0 and 9.5 and dehydrated and heat treated using air having a Dew point below 9.4° C. (15° F.) in the fluidized bed previously described at the indicated temperature and time. The Brabender and DSC results are shown below.

| | Waxy Maize (pH 7.0) | | |
|---|---|---|---|
| Dehydration/ Heat Treatment Conditions | Brabender Viscosity (BU) | | |
| | Peak | Peak + 10' | Breakdown (%) |
| Control* | 1010 | 220 | 78.2 |
| 93° C. for 0 min. | 1010 | 220 | 78.2 |
| 116° C. for 0 min. | 1030 | 250 | 75.7 |
| 127° C. for 0 min. | 1050 | 260 | 75.2 |
| 149° C. for 0 min. | 1130 | 350 | 69.0 |
| 160° C. for 0 min. | 1010 | 590 | 41.6 |
| 160° C. for 10 min. | 980 | 630 | 35.7 |
| 160° C. for 20 min. | 910 | 610 | 33.0 |
| 160° C. for 80 min. | 750 | 510 | 32.0 |
| 160° C. for 90 min. | 735 | 510 | 30.6 |

*Not pH-adjusted.

| Dehydration/ Heat Treatment Conditions | Peak Gelatinization Temperature** (°C.) | Enthalpy** (cal/g) |
|---|---|---|
| Control* | 73.07 | 4.43 |
| 93° C. for 0 min. | 71.79 | 4.01 |
| 116° C. for 0 min. | 70.70 | 4.18 |
| 127° C. for 0 min. | 70.66 | 4.07 |

-continued

| Dehydration/<br>Heat Treatment<br>Conditions | Peak<br>Gelatinization<br>Temperature** (°C.) | Enthalpy** (cal/g) |
|---|---|---|
| 149° C. for 0 min. | 70.07 | 3.92 |
| 160° C. for 0 min. | 69.50 | 4.08 |
| 160° C. for 10 min. | 71.20 | 4.17 |
| 160° C. for 20 min. | 68.87 | 4.32 |
| 160° C. for 80 min. | 67.84 | 4.35 |
| 160° C. for 90 min. | 67.29 | 4.38 |

*Not pH-adjusted.
**Average of 2 readings.

Waxy Maize (pH 9.5)

| Dehydration/<br>Heat Treatment<br>Conditions | Brabender Viscosity (BU) | | |
|---|---|---|---|
| | Peak | Peak + 10' | Breakdown (%) |
| Control (pH 9.5) | 1240 | 300 | 75.8 |
| 93° C. for 0 min. | 1200 | 300 | 75.0 |
| 104° C. for 0 min. | 1205 | 320 | 73.4 |
| 110° C. for 0 min. | 1260 | 400 | 68.3 |
| 121° C. for 0 min. | 1230 | 430 | 65.0 |
| 127° C. for 0 min. | 1255 | 420 | 66.5 |
| 138° C. for 0 min. | 1245 | 465 | 62.7 |
| 149° C. for 0 min. | 1300 | 490 | 62.3 |
| 160° C. for 0 min. | 1120 | 910 | 18.8 |
| 160° C. for 60 min. | 750 | 730 | 2.7 |
| 160° C. for 90 min. | 690 | 680 | 1.4 |

| Dehydration/<br>Heat Treatment<br>Conditions | Peak<br>Gelatinization<br>Temperature* (°C.) | Enthalpy* (cal/g) |
|---|---|---|
| Control (pH 9.5) | 74.82 | 4.05 |
| 127° C. for 0 min. | 74.84 | 4.17 |
| 160° C. for 0 min. | 73.04 | 4.50 |
| 160° C. for 60 min. | 71.84 | 4.60 |
| 160° C. for 90 min. | 70.86 | 4.26 |

*Average of 2 readings.

The DSC results show that at the onset of inhibition there was a slight reduction in the peak gelatinization temperature and that as the inhibition temperature and time increased there was a reduction in peak gelatinization temperature. The enthalpy is unchanged or slightly higher, unlike the enthalpy of the more highly inhibited starches of the prior example.

Example 18

This example shows the correlation between the RVA pasting temperature and time and DSC peak gelatinization temperature and time and the reduction in Brabender viscosity breakdown for various granular starch bases and for granular waxy maize starches dehydrated by various methods including heating, ethanol extraction, and freeze drying. The base starches were unmodified. The starches were all adjusted to pH 9.5 before dehydration. The ethanol-extracted and freeze-dried controls were pH adjusted and dehydrated but not heat treated. The dehydrated starches were all heat treated in an oven at 160° C. for the indicated time except for the starches chemically crosslinked with sodium trimetaphosphate (STMP) which were heat treated at 160° C. for the indicated time in the fluidized bed previously described.

The results are shown below.

| | Pasting | | DSC Peak | | Viscosity (B.U.) | | |
|---|---|---|---|---|---|---|---|
| Starch | Temp. (°C.) | Time (min) | Temp. (°C.) | Time (min) | Peak | Peak + 10' | Break down (%) |
| Tapioca Control | 68.20 | 3.7 | 70.61 | 6.6 | 1595 | 440 | 72.41 |
| Dehydrated Thermally/Heat Treated at 160° C. | | | | | | | |
| T-I (2 hrs.) | 66.65 | 3.4 | 68.31 | 6.3 | 1230 | 560 | 54.47 |
| T-I (6 hrs.) | 64.20 | 2.9 | 65.41 | 6.0 | 355 | 335 | 5.63 |
| Potato Control | 61.05 | 2.3 | 62.67 | 5.8 | 1825 | 1010 | 44.66 |
| Dehydrated Thermally/Heat Treated at 160° C. | | | | | | | |
| T-I (3 hrs.) | 60.25 | 2.1 | 61.41 | 5.6 | 995 | 810 | 18.59 |
| T-I (6 hrs.) | 60.20 | 2.1 | 61.13 | 5.6 | ris. | ris. | ris. |
| Waxy Maize Control | 70.95 | 4.3 | 73.86 | 6.9 | 1215 | 350 | 71.79 |
| Dehydrated Thermally/Heat Treated at 160° C. | | | | | | | |
| T-I (8 hrs.) | 68.15 | 3.7 | 70.71 | 6.6 | 760 | 720 | 5.26 |
| Waxy Maize Control | 70.95 | 4.3 | 74.23 | 6.9 | 1250 | 400 | 68.00 |
| Ethanol Dehydrated/Heat Treated at 160° C. | | | | | | | |
| T-I (2 hrs.) | 65.00 | 3.1 | 71.81 | 6.7 | ris. | ris. | ris. |
| T-I (7 hrs.) | 63.85 | 2.8 | 68.12 | 6.3 | ris. | ris. | ris. |
| Waxy Maize Control | 71.30 | 4.4 | 74.16 | 6.9 | 1240 | 320 | 74.19 |
| Dehydrated By Freeze Drying/Heat Treated at 160° C. | | | | | | | |
| T-I (6 hrs.) | 69.50 | 4.0 | 66.09 | 6.1 | ris. | ris. | ris. |
| T-I (8 hrs.) | 66.75 | 3.5 | 64.64 | 6.0 | ris. | ris. | ris. |
| Crosslinked Waxy Maize Control | 71.70 | N.D. | 74.33 | 6.9 | ris. | ris. | ris. |
| Thermally Dehydrated Crosslinked Waxy Maize* | | | | | | | |
| T-I (30 min.) | 69.10 | N.D. | 71.66 | 6.7 | ris. | ris. | ris. |
| T-I (150 min.) | 66.00 | N.D. | 67.14 | 6.2 | ris. | ris. | ris. |

*Fluidized bed.

The results show that heat treatment of thermally and non-thermally dehydrated granular starches reduced the pasting and peak gelatinization temperatures while at the same time inhibiting the viscosity breakdown. Because the gelatinization temperature has been lowered by the heat treatment of the dehydrated starch, less time is required to reach the pasting and gelatinization temperatures. The more highly inhibited starches showed a lower pasting temperature and less breakdown in viscosity.

Example 19

A granular waxy maize starch which had been lightly crosslinked with 0.04% phosphorous oxychloride was thermally-inhibited. The granular starch was jet-cooked and spray-dried using the coupled continuous jet-cooking/spray-drying process and conditions described in Example 9. The spray-dried starch was oven dehydrated and heat treated for 8 hours at 140° C.

The Brabender results and viscosity and textural characteristics of the resulting thermally-inhibited starch are set out below.

| | Viscosity (BU) | | | | | |
|---|---|---|---|---|---|---|
| | 30° C. | 30° C. + 10' | Peak | 95° C. | 95° C. + 10' | Breakdown (%) |
| Crosslinked Waxy Maize Control | 150 | 165 | 215 | 120 | 70 | 67 |
| T-I Crosslinked Waxy Maize Starch | 840 | 1085 | 1110 | 1090 | 1085 | 1 |

| | Cook Evaluation | |
|---|---|---|
| | Viscosity of Cook | Texture of Cook |
| Crosslinked Waxy Maize Control | thin to moderate | cohesive, pulpy |
| T-I Crosslinked Waxy Maize Starch | very heavy | non-cohesive, very pulpy, short |

The results show that after the dehydration and heat treatment steps the crosslinked starch was very highly inhibited.

Example 20

This example shows the thermal inhibition of converted starches.

Samples of waxy maize and tapioca starch were slurried in 1.5 parts water. The slurries were placed in a 52° C. water bath, with agitation, and allowed to equilibrate for one hour. Concentrated hydrochloric acid (HCl) was added at 0.8% on the weight of the samples. The samples were allowed to convert at 52° C. for one hour. The pH was then adjusted to 5.5 with sodium carbonate, then to pH 8.5 with sodium hydroxide. The samples were recovered by filtering and air drying (approximately 11% moisture). The starches in 50g amounts were placed in an aluminum tray, covered and placed into a forced draft oven at 140° C. for 5.5 hours. The starches were evaluated for inhibition.

The results set out in the following table.

| | Waxy Maize Viscosity (BU) | | | Tapioca Viscosity (BU) | | |
|---|---|---|---|---|---|---|
| | Peak | Peak + 10' | Breakdown (%) | Peak | Peak + 10' | Breakdown (%) |
| unmodified | 1380 | 250 | 81.9 | 810 | 225 | 72.2 |
| acid converted | 640 | 110 | 82.3 | 432 | 115 | 73.4 |
| T-I acid converted | 805 | 728 | 9.6 | 495 | 350 | 29.3 |

The results show that converted starches can be thermally inhibited by this process.

Example 21

Waxy maize samples reacted with 7% and 3% by weight propylene oxide (PO) were thermally inhibited, at the naturally occurring pH and at pH 9.5, and evaluated for inhibition.

The results set out in the following tables.

| | | Viscosity (BU) | | | | |
|---|---|---|---|---|---|---|
| Temp. (°C.) | Time (min.) | Peak | Peak + 10' | 92° C. | 92° C. + 30' | Breakdown (%) |
| Waxy Maize (7% PO and natural pH at 160° C.) | | | | | | |
| Control | — | 1420 | 395 | — | — | 72 |
| 160 | 0 | 1030 | 380 | — | — | 63 |
| 160 | 30 | 800 | 530 | — | — | 34 |
| 160 | 60 | 685 | 430 | — | — | 37 |
| 160 | 90 | 635 | 340 | — | — | 46 |
| 160 | 120 | 620 | 340 | — | — | 45 |
| 160 | 150 | 565 | 300 | — | — | 47 |
| 160 | 180 | 540 | 280 | — | — | 48 |
| Waxy Maize (7% PO and pH 9.5 at 160° C.) | | | | | | |
| Control | — | 1420 | 395 | — | — | 72 |
| 160 | 0 | 1360 | 960 | — | — | 29 |
| 160 | 30 | 1010 | 950 | — | — | 6 |
| 160 | 60 | 1030 | 930 | — | — | 10 |
| 160 | 90 | 910 | 890 | — | — | 2 |
| 160 | 120 | 843 | 830 | — | — | 2 |
| 160 | 180 | 800 | 792 | — | — | 1 |
| Waxy Maize (3% PO and natural pH at 160° C.) | | | | | | |
| Control | — | 1155 | 280 | — | — | 76 |
| 160 | 0 | 900 | 360 | — | — | 60 |
| 160 | 30 | 570 | 370 | — | — | 35 |
| 160 | 60 | 480 | 350 | — | — | 27 |
| 160 | 90 | 440 | 300 | — | — | 32 |
| 160 | 120 | 375 | 235 | — | — | 37 |
| 160 | 150 | 310 | 185 | — | — | 40 |
| 160 | 180 | 300 | 180 | — | — | 40 |
| Waxy Maize (3% PO and pH 9.5 at 160° C.) | | | | | | |
| Control | — | 1155 | 280 | — | — | 76 |
| 160 | 0 | 1220 | 960 | — | — | 21 |
| 160 | 30 | 1020 | 950 | — | — | 7 |
| 160 | 60 | 880 | 865 | — | — | 2 |
| 160 | 90 | — | — | 750 | 790 | ris. |
| 160 | 120 | — | — | 620 | 780 | ris. |
| 160 | 150 | — | — | 510 | 750 | ris. |
| 160 | 180 | — | — | 400 | 700 | ris. |

The data show that derivatized starches, in this case etherified starches, can be thermally inhibited by this process and that higher inhibition can be achieved at higher pH.

Example 22

A converted hydroxypropylated waxy maize starch (25 WF starch reacted with 2% propylene oxide) was adjusted to pH 9.5 and thermally inhibited using the fluidized bed previously described. Samples were taken at 110° C., 125° C., and 140° C., all for 0 minutes.

The thermally-inhibited starch samples were cooked in tap water at 88°–93° C. (190°–200° F.) bath temperature for 30–60 minutes to yield solutions having a Brookfield viscosity of approximately 3000 cps. The viscosity stability at room temperature was evaluated. The control was a hydroxy-propylated waxy maize starch which was not thermally-inhibited.

The results are tabulated below.

| | Solution Stability | | | |
|---|---|---|---|---|
| | Control | 110° C. | 125° C. | 140° C. |
| Water Fluidity | 25.0 | 25.5 | 20.6 | 21.8 |
| Solids (%) | 18 | 18 | 18 | 18 |
| Initial Viscosity (cps) | 3160 | 2550 | 2820 | 2800 |
| Viscosity after 24 hours (cps) | 3280 | — | — | 2640 |
| Viscosity after 7 days (cps) | 3020 | 2475 | 2730 | 2810 |
| Viscosity after 8 days (cps) | 3000 | 1980 | 2140 | 2940 |
| Viscosity after 9 days (cps) | 2850 | 1990 | 2230 | 2870 |
| Appearance | clear | clear | clear | yellow |

Example 23

Waxy maize samples were reacted with 1% by weight acetic anhydride ($Ac_2O$) and thermally-inhibited at the naturally occurring pH and at pH 8.5. The control was the non-thermally-inhibited waxy maize starch acetate.

The results are shown below.

| | | Viscosity (BU) | | | |
|---|---|---|---|---|---|
| Time (min) | Peak | Peak + 10' | 92° C. | 92° C. + 30' | Breakdown % |
| Waxy Maize (1% $Ac_2O$ and natural pH at 160° C.) | | | | | |
| Control | — | 1480 | 490 | — | — | 67 |
| 0 | 1030 | 570 | — | — | 45 |
| 30 | 880 | 650 | — | — | 26 |
| 60 | 720 | 510 | — | — | 29 |
| 120 | 605 | 490 | — | — | 19 |
| 180 | 545 | 460 | — | — | 16 |
| Waxy Maize (1% $Ac_2O$ and natural pH at 160° C.) | | | | | |
| Control | — | 1480 | 490 | — | — | 87 |
| 0 | 1170 | 560 | — | — | 52 |
| 30 | 970 | 725 | — | — | 25 |
| 60 | 875 | 600 | — | — | 31 |
| 120 | 690 | 490 | — | — | 29 |
| 180 | 585 | 545 | — | — | 7 |

The data show that derivatized starches, in this case esterified starches, can be inhibited to varying degrees and that higher inhibition can be obtained at higher pH.

Example 24

This example shows the preparation of potato starches modified with an amino-multicarboxylic acid (CEPA) reagent, i.e., 2-chloroethylaminodipropionic acid and their subsequent thermal-inhibition.

Overhead stirring was used throughout this reaction. Deionized water (150 ml) was added to a liter beaker and heated to 45° C. with an external constant temperature bath. A total of 30 g sodium sulfate (30% on starch) was dissolved in the water followed by the addition of 100 g of the potato starch. A solution of 3% aqueous sodium hydroxide (25 ml) was added slowly with good agitation to minimize starch swelling. A 25% aqueous solution of the CEPA reagent (32 ml) to give an 8% starch treatment (dry basis) was added simultaneously with a 3% aqueous sodium hydroxide solution (170 ml). The addition rates used kept the level of caustic high so that pH was about 11.0 to 11.5 during the reaction. The reaction was run at 42°–45° C. for 16 hours and then neutralized by adding 3N hydrochloric acid to adjust pH to about 6.5, followed by stirring for 30 minutes. The starch was then filtered and washed twice with 150 ml of water and allowed to air dry. Analysis of the starch for bound nitrogen showed 0.25% N (dry basis).

The starches were adjusted to pH 9.5 and heat treated at 100° C., 110° C., 120° C., 130° C. and 140° C. for 0 minutes using the fluidized bed previously described.

Example 25

This example shows the use of thermally-inhibited converted acetylated waxy maize starch as an adhesive for bonding kraft paper.

A waxy maize starch converted to a water fluidity of 75–85 and derivatized with 3% acetic anhydride was adjusted to pH 9.5, and thermally-inhibited using the fluidized bed reactor as previously described. Samples were taken at 110° C., 130° C., 150° C., and after 90 minutes at 160° C.

Preparation of the Adhesive

The starch samples were cooked at the indicated solids in tap water at 88°–93° C. (190°–200° F.) bath temperature for 30 minutes to yield a final solution having a Brookfield viscosity of approximately 1200–1500 cps, which is typical of a standard commercial starch cook. The % solids were recorded using a standard optical refractometer.

The viscosity stability at room temperature of the starch cooks was evaluated. Adhesion properties were examined by drawing down a wet film of adhesive using a 3.0 mil bird applicator on kraft paper, followed by mating with a second sheet of kraft paper. This bond was then moderately compressed with a hand roller and allowed to dry overnight. Percent fiber tear following a slow hand pull of the dried bond was evaluated, with 100% indicating a completely destructive bond. The control was the converted acetylated starch which was not thermally inhibited.

The results are tabulated below:

| | Control | 110° C. for 0 min | 130° C. for 0 min | 150° C. for 0 min | 160° C. for 90 min |
|---|---|---|---|---|---|
| Water Fluidity | 71.4 | 73.7 | 73.5 | 74.3 | 73.7 |
| Solids % | 17 | 18 | 18 | 18 | 18 |
| Initial Viscosity (cps) | 1300 | 1460 | 1490 | 1350 | 1320 |
| Viscosity after 24 hours (cps) | 1710 | 1840 | 1620 | 1880 | 1430 |
| Viscosity after 6 days (cps) | 3160 | 3020 | 2820 | 2670 | 1810 |
| Viscosity after 7 days (cps) | 3050 | 3270 | 2940 | 2750 | 1710 |
| Viscosity after 8 days (cps) | 3390 | 3460 | 3160 | 2910 | 1760 |
| Overall Viscosity Change (%) | 161 | 137 | 112 | 116 | 33 |
| Adhesion | 100% | 100% | 100% | 100% | 100 |

-continued

|  | Control | 110° C. for 0 min | 130° C. for 0 min | 150° C. for 0 min | 160° C. for 90 min |
|---|---|---|---|---|---|
| (film tear) |  |  |  |  |  |
| Appearance | white | white | white | gray | gray-brown |

As shown above, the thermal inhibition process tended to impart a slight improvement in overall stability of the solution viscosity versus the control. The more thermally-inhibited starch showed an unusually high level of stability. Under these test conditions, the thermal inhibition did not provide either increased or decreased adhesion characteristics.

Example 26

This example shows the use of a thermally-inhibited, acid converted, hydroxypropylated waxy maize starch as cigarette-making adhesives in the three bonding applications, i.e., cigarette paper to itself for the side seam, tipping paper to itself, and tipping paper to cigarette paper to mimic the tipping bonds.

The acid converted, hydroxypropylated waxy maize (25 WF starch reacted with 2% propylene oxide) was adjusted to pH 9.5 and thermally inhibited using the fluidized bed previously described. Samples were taken at 110° C., 125° C., and 140° C.

The thermally-inhibited starch samples were cooked in tap water at 88°–93° C. (190°–200° F.) bath temperature for 30–60 minutes to yield solutions having a Brookfield viscosity of approximately 3000 cps. The viscosity stability at room temperature and adhesion characteristics were evaluated. The control was the acid-converted, hydroproplated starch which was not thermally inhibited.

The results are tabulated below.

| Solution Stability |  |  |  |  |
|---|---|---|---|---|
|  | A Control | B 110° C. for 0 min | C 125° C. for 0 min | D 140° C. for 0 min |
| Water Fluidity | 25.0 | 25.5 | 20.6 | 21.8 |
| Solids (%) | 18 | 18 | 18 | 18 |
| Initial Viscosity (cps) | 3160 | 2550 | 2820 | 2800 |
| Viscosity after 24 hours (cps) | 3280 | — | — | 2640 |
| Viscosity after 7 days (cps) | 3020 | 2475 | 2730 | 2810 |
| Viscosity after 8 days (cps) | 3000 | 1980 | 2140 | 2940 |
| Viscosity after 9 days (cps) | 2850 | 1990 | 2230 | 2870 |
| Appearance | clear | clear | clear | yellow |

The percent fiber tear following a slow hand pull of the dried bond was evaluated, with 100% indicating a completely destructive bond.

| Tear Of Samples |  |  |  |  |  |
|---|---|---|---|---|---|
| Bond | A | B | C | D | E |
| cig-cig | 100 | 100 | 100 | 100 | 100 |
| cig-tip | 100 | 100 | 100 | 100 | 100 |
| tip-tip | 100 | 100 | 100 | 100 | 100 |

Since the adhesion characteristics of the above samples were achieved at significantly lower solids contents than a commercial starch material (18% vs. 45%), studies were carried out comparing the non-thermally-inhibited base starch and Sample D at various solids contents. The results are shown below:

The percent fiber tear (FT) following a slow hand pull of the dried bond was evaluated, with 100% indicating a completely destructive bond.

| Film Tear |  |  |  |
|---|---|---|---|
| Bond |  | Control | Sample D 140° C. for 0 minutes |
| Cig-cig | 15% solids | 100% FT | 100% FT |
|  | 10% solids | 100% FT | 100% FT |
|  | 5% solids | 0% FT | 25% FT |
| Tip-tip | 15% solids | 100% FT | 100% FT |
|  | 10% solids | 100% FT | 100% FT |
|  | 5% solids | 15% FT | 15% FT |
| Cig-tip | 15% solids | 100% FT | 100% FT |
|  | 10% solids | 100% FT | 100% FT |
|  | 5% solids | 0% FT | 10% FT |

As indicated by the above results, thermal inhibition appears to impart enhanced adhesion. No increase or decrease in solution viscosity stability was noted.

Example 27

This example shows the use of a thermally-inhibited (T-I) waxy maize starch in an envelope adhesive. A lightly crosslinked starch was used as the control.

The waxy maize was adjusted to pH 9.5 and thermally inhibited at 160° C. for 180 minutes using the fluidized bed as previously described.

The ingredients are listed below.

| Ingredients | Control | T-I Waxy Maize |
|---|---|---|
| Water | 40.00 | 40.00 |
| Petroleum-based defoamer | 0.30 | 0.30 |
| Dextrin-emulsified vinyl acetate homopolymer | 18.29 | 18.29 |
| Crosslinked amioca | 0.80 | — |
| T-I Waxy maize | — | 0.80 |
| Dextrin-emulsified polyvinyl acetate | 18.29 | 18.29 |
| Waxy maize dextrin | 46.96 | 46.96 |
| Propylene glycol | 1.98 | 1.98 |
| Polyethylene glycol (Carbowax 600) | 2.96 | 2.96 |

-continued

| Ingredients | Control | T-I Waxy Maize |
|---|---|---|
| Dioctyl sulfosuccinate | 0.10 | 0.10 |
| Xathon LX1.5 | 0.15 | 0.15 |
| Petroleum-based defoamer | 0.20 | 0.20 |
| Methyl salicylate | 0.09 | 0.09 |

The first five ingredients were mixed for 15 minutes, the dextrin-emulsified ethylene vinyl acetate and amioca dextrin were added, and mixture was stirred for 30 minutes at 180°–190° F. The remaining ingredients were added and mixed in while cooling.

After dilution with 21 mls of water, the control adhesive (69.2% solids) had a Brookfield viscosity of >50,000 cps at 27° C. (75° F.) whereas the adhesive containing the thermally-inhibited starch (68.0% solids) had a viscosity of 48,050 cps at 22° C. (75° F.). After dilution with an additional 11 mls of water, the respective viscosities were 24,550 cps (control) and 22,200 cps (T-I starch). The check chill viscosity after aging overnight was 25,200 cps for the control and 21,800 cps for the T-I starch.

An evaluation of "cottoning" was done on each sample. The results were comparable.

Example 28

This example shows the use of blends of thermally-inhibited corn starch and thermally-inhibited high amylose corn starch (70% amylose) as the carrier starches of corrugating adhesives.

The adhesives were formulated as follows:

| | #1 | #2 | #3 | #4 |
|---|---|---|---|---|
| Primary Tank | | | | |
| Cook water | 2335 g | 2335 g | 2335 g | 2335 g |
| T-I Corn/T-I High Amylose Blend (60/40) (pH 9.5; 160° C. for 60 min) | 560 g | — | — | — |
| T-I Corn/T-I High Amylose Blend (60/40) (pH 9.5; 160° C. for 180 min) | — | 560 g | — | — |
| Unmodified Corn/High Amylose Blend (Control) | — | — | 560 g | — |
| Crosslinked Corn/High Amylose Blend (0.005% epichlorohydrin)* | — | — | — | 560 g |
| Sodium Hydroxide | 101 g | 101 g | 101 g | 101 g |
| Water (for dilution of NaOH) | 234 g | 234 g | 234 g | 234 g |
| Borax (5 mole) | 17 g | 17 g | 17 g | 17 g |
| Quench water 75° F. | 2335 g | 2335 g | 2335 g | 2335 g |
| Secondary Tank | | | | |
| Water (95° F.) | 7006 g | 7006 g | 7006 g | 7006 g |
| Unmodified raw corn starch | 3640 g | 3640 g | 3640 g | 3640 g |
| Borax (5 mole) | 67 g | 67 g | 67 g | 67 g |

*Comparative

The moisture of the carrier starches and the raw starch was 10% and the water was adjusted accordingly.

The water and the carrier starch were heated to 130° F. The sodium hydroxide and the dilution water were mixed. Mixing was continued for 10 minutes. The borax was added and mixing was continued for 20 minutes. The quench water was added and mixing was continued for 5 minutes.

The mixture from the primary tank was added to the contents of the secondary tank at medium speed (860 rpm) over a 20–30 minute period. After the addition was completed, the mixer speed was increased to high (1450 rpm) and mixing was continued for 60 minutes.

With the adhesive at 100° F., the Stein-Hall and Brookfield viscosity readings were taken after 0, 30, and 60 minute high speed mixing. The results are shown below:

| | Adhesive Viscosities | | |
|---|---|---|---|
| Carrier Starch | Stein Hall Viscosity (sec) | Brookfield Viscosity 20 rpm (cps) | Brookfield Viscosity 100 rpm (cps) |
| Control - Unmodified Starch Blend | 26 | 224 | 228 |
| Crosslinked Starch* | 33 | 286 | 273 |
| T-I Starch Blend (pH 9.5; 160° C. for 60 min) | 24 | 2375 | 784 |
| T-I Starch Blend (pH 9.5; 160° C. for 180 min) | 19 | 1580 | 502 |

*Comparative

Doubleback samples were prepared for adhesive testing.

Using the freshly prepared adhesive, a small quantity (approximately 50 grams) of the adhesive was poured on glass drawdown plate. Using a 6"×10" bird applicator, an adhesive drawdown was made by pulling the applicator towards oneself to create an adhesive film. A 6"×10" single-face web was placed over the adhesive drawdown and pressed down uniformly in order to wet the flute tips. A 6"×12" liner was placed on a hot plate preset at 350° F. and the wetted singleface web was quickly transferred onto the liner, covered with a weighted lid, held for five (5) seconds, and removed immediately. The finished board samples were placed in a 72° F./50% relative humidity room to equilibrate for a period of at least 24 hours. For testing, the board was cut in the following manner: (a) first, the excess liner was cut off from both ends of the prepared boards; (b) a 1"×10" strip of doubleback board was cut off using a specially designed cutter and discarded; (c) from the remaining board, two 2"×10" board samples were cut; and (d) each 2"×10" strip was cut in half.

The 2" by 5" strips were tested for dry pin strength using an appropriate H&D tester.

The adhesive results are shown below:

| | Adhesive Bond Strength - Doubleback Dry Pins | | |
|---|---|---|---|
| Carrier Starch | Average (lbs.) | Std. Dev. | Fiber Tear (%) |
| Control - Unmodified Starch Blend | 179 | 9 | 100 |
| Comparative- Crosslinked Starch Blend | 183 | 6 | 100 |

Adhesive Bond Strength - Doubleback Dry Pins

| Carrier Starch | Average (lbs.) | Std. Dev. | Fiber Tear (%) |
|---|---|---|---|
| T-I Starch Blend (pH 9.5; 160° C. for 60 min) | 174 | 7 | 100 |
| T-I Starch Blend (pH 9.5; 160° C. for 180 min) | 182 | 6 | 100 |

*Average of 16 runs.

The results show that the thermally-inhibited starches can be used as carrier starches in a typical corrugating adhesive, giving bond strengths (as measured by doubleback evaluations) and Stein Hall viscosities comparable to unmodified or chemically crosslinked carrier starches. The viscosity of adhesives prepared with the thermally-inhibited starches as the carrier starch also possessed unique viscosity behavior. The adhesives prepared using the thermally-inhibited starches as the carriers had much higher Brookfield viscosities than the chemically crosslinked or the untreated starches.

Example 29

This example describes the preparation of a natural-based, lay-flat laminating adhesive. Adhesives A and B are formulated as follows:

| | Parts | |
|---|---|---|
| Ingredients | A | B |
| Water | 60 | 60 |
| Unmodified waxy maize starch | 5 | — |
| T-I corn starch (pH 9.5; 160° C. for 90 minutes) | — | 5 |
| T-I converted waxy maize (85 WF; pH 9.5; 160° C. for 180 minutes) | — | 10 |
| Corn syrup (humectant) | 30 | 30 |
| Sodium Nitrate | 18 | 18 |
| Urea | 12 | 12 |

It is expected that the resulting adhesives will have better viscosity stability because of the thermal inhibition and better adhesion because of the higher starch solids which can be used since the viscosity of the adhesive will be stable.

Example 30

This example describes the preparation of an adhesive suitable for use in tissue ply-bonding for the manufacturing of towels and disposables.

The adhesive is formulated as follows:

| Ingredients | Parts |
|---|---|
| Water | 80 |
| T-I Hydroxypropylated Waxy Maize (8% propylene oxide; pH 9.5; 160° C. for 180 min.) | 20 |

It is expected that the viscosity stability and adhesion will be improved.

Example 31

This example describes the preparation of a typical bottle labeling adhesive.

The adhesive formulation (400 g) contains the following ingredients:

| Ingredient | % |
|---|---|
| Water | 41.9 |
| T-I Converted Tapioca Starch (35 WF; pH 9.5; 160° C. for 120 minutes) | 30.0 |
| Urea | 12.0 |
| Aluminum Sulfate (Crosslinker) | 1.0 |
| Ethylene-Vinyl Acetate Resin | 15.0 |
| Preservative | 0.1 |

The starch is slurried in water and heated to (190° F.). During the heating the urea is added all at once. The slurry is cooked at 88° C. (190° F.) for 20 minutes and cooled to 57° C. (135° F.). The crosslinker, predissolved in 10% water (based on the 400 g. sample), is slowly added and mixed thoroughly for 10–15 minutes. The resin is slowly added and mixed thoroughly for 10–15 minutes. The preservative is added and mixed thoroughly for 5–10 minutes. The mixture is cooled to 22° C. (72° F.) and the pH, % solids, and initial viscosity are measured. The pH should be 7–8; the solids should be 40–45%; and the initial viscosity should be 50,000–60,000 cps.

It is expected that this adhesive will have better tack, good rheological properties such as good flowability, and good adhesion. In addition, the elimination of casein lowers the formulating cost.

Example 32

This example describes the preparation of a ceramic tile cement.

The following dry ingredients are blended together:

| Ingredient | Parts |
|---|---|
| Type 1 Portland Cement | 350 |
| Silica sand (F 65 grade) | 620 |
| Lime (Type 5), Calcium Hydroxide | 25 |
| High viscosity hydroxypropylated methylcellulose (Dow K15 M) | 2.5 |
| T-I Pregelatinized Granular Waxy Maize Starch (pH 9.5; 160° C. for 0 minutes) | 2.5 |

A total of 225 parts of water are added to the blended dry ingredients and mixed until smooth. The adhesive should have a Brookfield heliopath viscosity of 225,000 cps (TF spindle, 10 rpm).

The advantages of this formulation should be improved workability and lowered trowelling cost.

Now that the preferred embodiments of the present invention have been described in detail, various modifications and improvements thereto will become readily apparent to those skilled in the art. Accordingly, the spirit and scope of the invention are to be limited only by the appended claims and foregoing specification.

What is claimed:

1. An adhesive which comprises an aqueous carrier containing an effective amount of a solubilized thermally-inhibited starch or flour, which starch or flour, after dispersion in water, is characterized by its improved viscosity stability in comparison to the non-thermally-inhibited base starch, which thermally-inhibited starch or flour is prepared by the steps of thermally or non-thermally dehydrating the starch or flour to anhydrous or substantially anhydrous and heat treating the anhydrous or substantially anhydrous starch or flour for a time and at a temperature sufficient to inhibit the starch or flour and improve its viscosity stability.

2. The adhesive of claim 1, wherein the thermally-inhibited starch or flour is a non-pregelatinized thermally-inhibited granular starch or flour.

3. The adhesive of claim 1, wherein the thermally-inhibited starch or flour is a pregelatinized granular or non-granular thermally-inhibited starch or flour.

4. The adhesive of claim 1, wherein the pH of the starch or flour is raised to neutral or greater prior to the dehydration.

5. The adhesive of claim 1, wherein the starch or flour is a cereal starch or flour, a tuber starch or flour, a root starch or flour, a legume starch or flour, or a fruit starch or flour.

6. The adhesive of claim 5, wherein the thermally-inhibited starch or flour is selected from the group consisting of corn, pea, oat, potato, sweet potato, banana, barley, wheat, rice, sago, amaranth, tapioca, sorghum, waxy maize, waxy tapioca, waxy rice, waxy barley, waxy potato, waxy sorghum, and a high amylose corn starch having an amylose content of 40% or greater.

7. The adhesive of claim 1, wherein the thermally-inhibited starch is corn, potato, rice, oat, waxy maize, waxy tapioca, waxy rice, waxy barley, or waxy potato and wherein the thermally-inhibited flour is tapioca flour.

8. The adhesive of claim 1, wherein the thermally-inhibited starch is a highly inhibited starch present in an amount of about 1–20% by weight or a lightly inhibited starch present in an amount of about 1–40% by weight, based on the weight of the adhesive composition.

9. The adhesive of claim 8, wherein the highly inhibited starch is about 2–5% and the lightly inhibited starch is about 10–20%.

10. The adhesive of claim 1, wherein the adhesive is a liquid or paste adhesive prepared by cooking the thermally-inhibited starch or flour in water.

11. The adhesive of claim 1, which is a remoistenable adhesive comprising an aqueous emulsion of an ethylene-vinyl acetate polymer, an emulsifier or a protective colloid, a dextrin, and the thermally-inhibited starch.

12. The adhesive of claim 1, wherein the adhesive is selected from the group consisting of a cigarette bonding adhesive, a bottle labeling adhesive, a laminating adhesive, a tube-winding adhesive, and a ply bonding adhesive.

13. The adhesive of claim 1, wherein the adhesive is a ceramic title adhesive.

14. The adhesive of claim 1, wherein the starch is adjusted to a pH of neutral or greater prior to the dehydrating and heat treating steps.

15. The adhesive of claim 14, wherein the starch is adjusted to a pH of about 7.5 to about 10.5.

16. The adhesive of claim 15, wherein the starch is adjusted to a pH of above about 8 to below about 10.

17. The adhesive of claim 14, wherein the dehydrated starch is heat treated at about 120° to about 180° C.

18. The adhesive of claim 14, wherein the starch is dehydrated and heat treated in a fluidized bed at about 140° to about 160° C. for up to about 20 hours.

19. The adhesive of claim 1, wherein the dehydrated starch is heat treated at about 120° to about 180° C.

20. A corrugating adhesive which comprises water, an alkali, a gelatinized thermally-inhibited carrier starch, and an ungelatinized starch which thermally-inhibited starch or flour, after dispersion in water, is characterized by its improved viscosity stability in comparison to the non-thermally-inhibited base starch, which thermally-inhibited starch or flour is prepared by the steps of thermally or non-thermally dehydrating the starch or flour to anhydrous or substantially anhydrous and heat treating the anhydrous or substantially anhydrous starch or flour for a time and at a temperature sufficient to inhibit the starch or flour and improve its viscosity stability.

21. The adhesive of claim 20, wherein the thermally-inhibited gelatinized carrier starch is selected from the group consisting of corn, high amylose corn, potato, wheat and mixtures thereof.

22. The adhesive of claim 21, wherein the thermally-inhibited gelatinized carrier starch is a mixture of corn starch and high amylose corn starch.

23. A corrugating adhesive which comprises water, an alkali, a gelatinized carrier starch and an ungelatinized thermally-inhibited starch, which thermally-inhibited starch or flour is prepared by the steps of thermally or non-thermally dehydrating the starch or flour to anhydrous or substantially anhydrous and heat treating the anhydrous or substantially anhydrous starch or flour for a time and at a temperature sufficient to inhibit the starch or flour and improve its viscosity stability.

* * * * *